United States Patent
Engedal et al.

(10) Patent No.: US 9,909,864 B2
(45) Date of Patent: Mar. 6, 2018

(54) SYSTEM, DEVICE AND METHOD FOR TRACKING POSITION AND ORIENTATION OF VEHICLE, LOADING DEVICE AND CARGO IN LOADING DEVICE OPERATIONS

(75) Inventors: Torbjørn Engedal, Flekkerøy (NO); Harald Nøkland, Kristiansand (NO); David Gustavsson, Linköping (SE)

(73) Assignee: Optilift AS, Kristiansand (NO)

( * ) Notice: Subject to any disclaimer, the term of this patent is extended or adjusted under 35 U.S.C. 154(b) by 866 days.

(21) Appl. No.: 14/118,974

(22) PCT Filed: May 18, 2012

(86) PCT No.: PCT/NO2012/050092
§ 371 (c)(1),
(2), (4) Date: Jan. 6, 2014

(87) PCT Pub. No.: WO2012/161584
PCT Pub. Date: Nov. 29, 2012

(65) Prior Publication Data
US 2014/0107971 A1    Apr. 17, 2014

(30) Foreign Application Priority Data

May 20, 2011  (NO) .................................... 20110747

(51) Int. Cl.
*G01B 21/00* (2006.01)
*B66D 1/52* (2006.01)
*B66C 13/04* (2006.01)
(Continued)

(52) U.S. Cl.
CPC .............. *G01B 21/00* (2013.01); *B66C 13/02* (2013.01); *B66C 13/04* (2013.01); *B66D 1/52* (2013.01); *B66D 1/525* (2013.01); *B66C 13/46* (2013.01)

(58) Field of Classification Search
None
See application file for complete search history.

(56) References Cited

U.S. PATENT DOCUMENTS 5,089,972 A * 2/1992 Nachman ................ B66C 13/46
                                                      414/139.7
5,938,052 A * 8/1999 Miyano ................. B66C 13/063
                                                      212/270
(Continued)

FOREIGN PATENT DOCUMENTS

| EP | 1894881 | 3/2008 |
|----|---------|--------|
| GB | 2267360 | 12/1993 |
| WO | 9114644 | 10/1991 |

(Continued)

OTHER PUBLICATIONS

International Preliminary Report on Patentability, PCT/NO2012/050092, dated Nov. 20, 2013.

*Primary Examiner* — John Kuan
(74) *Attorney, Agent, or Firm* — Boyle Fredrickson S.C.

(57) ABSTRACT

The present invention generally relates to a system, device and a method for loading and/or unloading a cargo to and/or from a second vehicle where a loading device is mounted on a first vehicle. More specifically, the present invention relates to a method and a device for a sensor system (with sensor platform deployed at the crane tip) used for heave compensation and 3D positioning of cargo and second vehicle during loading and unloading process of cargo to/from a ship where a crane is mounted on an oil rig.

20 Claims, 18 Drawing Sheets

Schematic view

(51) Int. Cl.
    *B66C 13/02*        (2006.01)
    *B66C 13/46*        (2006.01)

(56) References Cited

U.S. PATENT DOCUMENTS

| | | | |
|---|---|---|---|
| 5,943,476 A * | 8/1999 | Dougherty | B25J 9/1694 |
| | | | 700/251 |
| 6,256,553 B1 | 7/2001 | Erikkila | |
| 6,343,703 B1 | 2/2002 | Fleagle et al. | |
| 6,351,720 B1 * | 2/2002 | Hoshina | G01B 11/00 |
| | | | 352/243 |
| 6,505,574 B1 | 1/2003 | Naud et al. | |
| 6,744,372 B1 * | 6/2004 | Shaw | B66C 13/44 |
| | | | 212/276 |
| 6,826,452 B1 | 11/2004 | Holland et al. | |
| 7,367,464 B1 | 5/2008 | Agostini et al. | |
| 8,235,231 B2 * | 8/2012 | Schneider | B63B 27/10 |
| | | | 212/277 |
| 2002/0024598 A1 | 2/2002 | Kunimitsu et al. | |
| 2004/0032140 A1 | 2/2004 | Solstad | |
| 2005/0224438 A1 | 10/2005 | Maurer et al. | |
| 2005/0232626 A1 | 10/2005 | Schulte et al. | |
| 2005/0281644 A1 | 12/2005 | Lussen et al. | |
| 2007/0289931 A1 | 12/2007 | Henriksson | |
| 2010/0089855 A1 | 4/2010 | Kjolseth | |
| 2012/0092643 A1 * | 4/2012 | Rintanen | B66C 13/46 |
| | | | 356/4.01 |

FOREIGN PATENT DOCUMENTS

| | | |
|---|---|---|
| WO | 2010109075 | 9/2010 |
| WO | 2011135310 | 11/2011 |

* cited by examiner

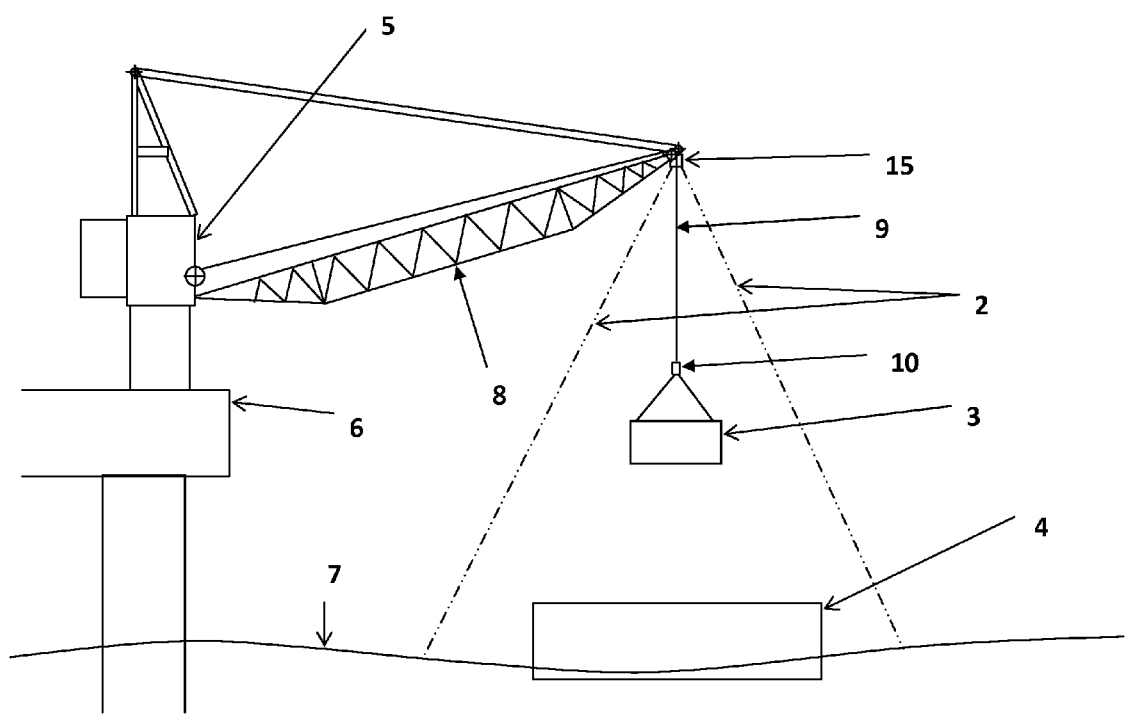
Figure 1 Schematic view

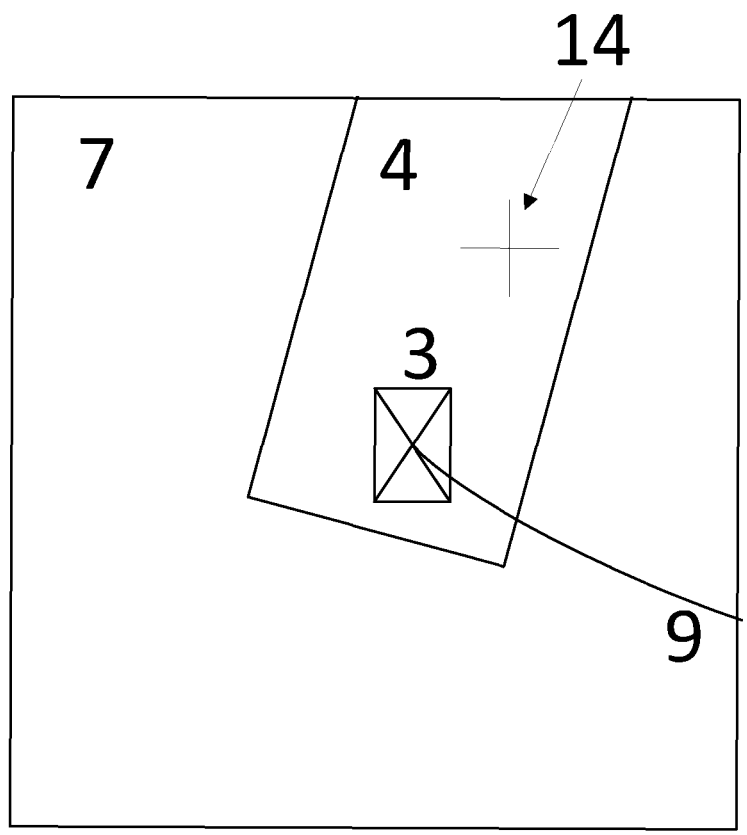
Figure 2 View from sensor system in crane boom, pointing downwards

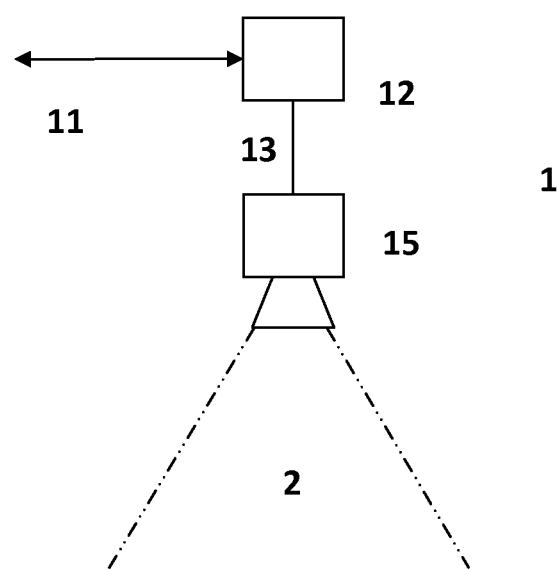
Figure 3 Sensor System

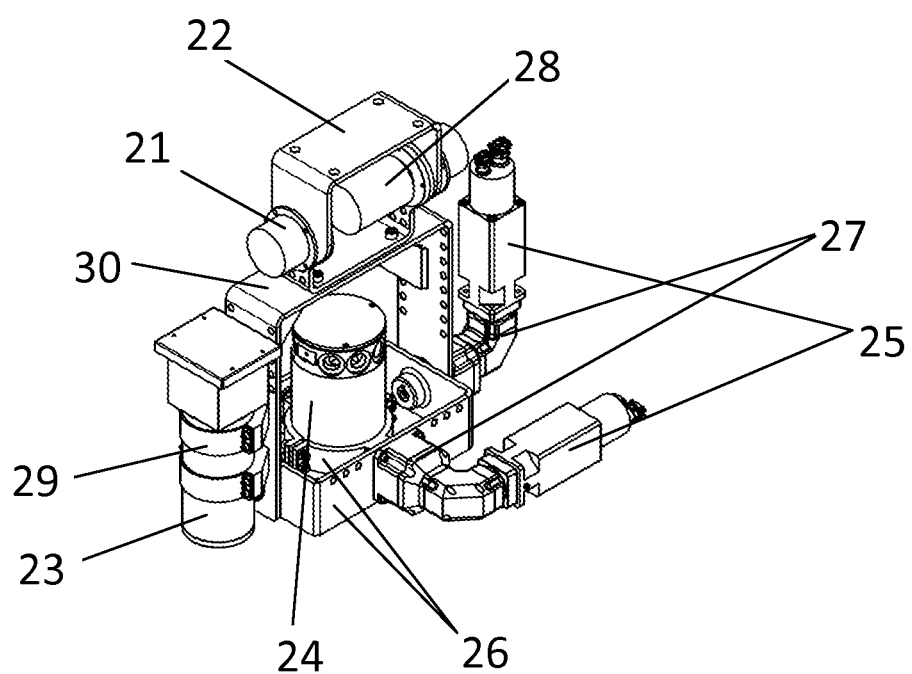
Figure 4 – One embodiment of Sensor platform

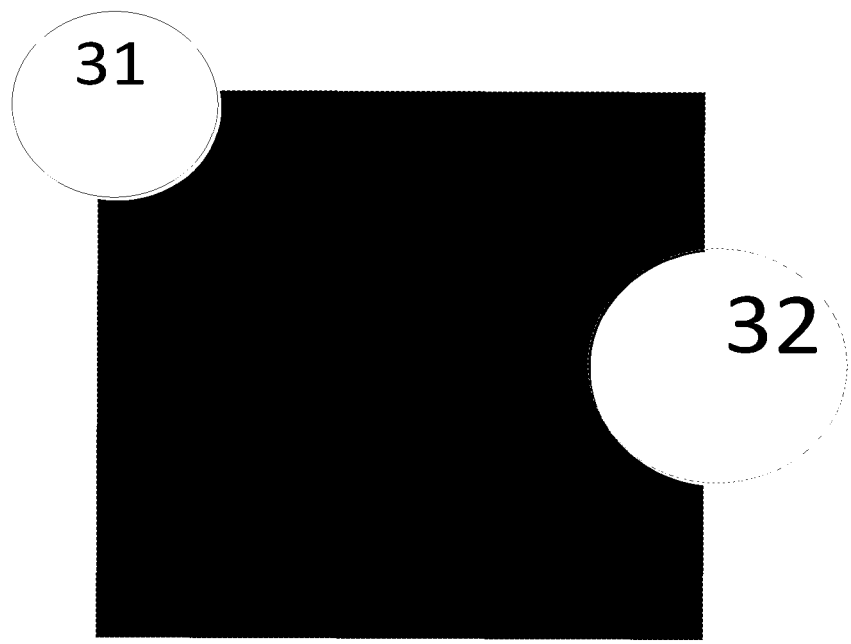
Figure 5 – Feature point

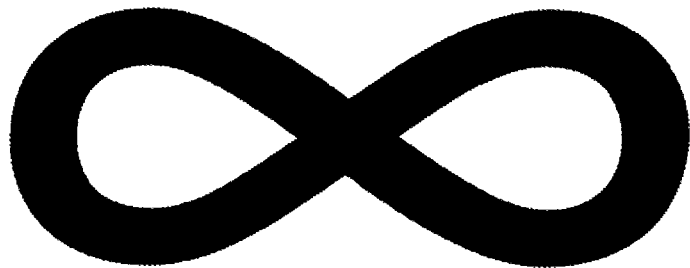
Figure 6 - Example of "Eight pattern" range movement
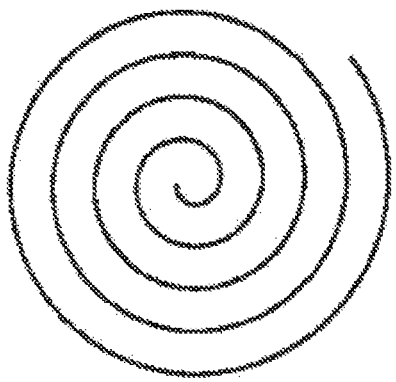
Figure 7 - Example of spiral range movement

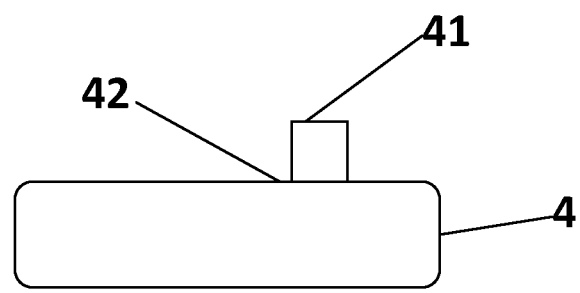
Figure 8 - Vessel

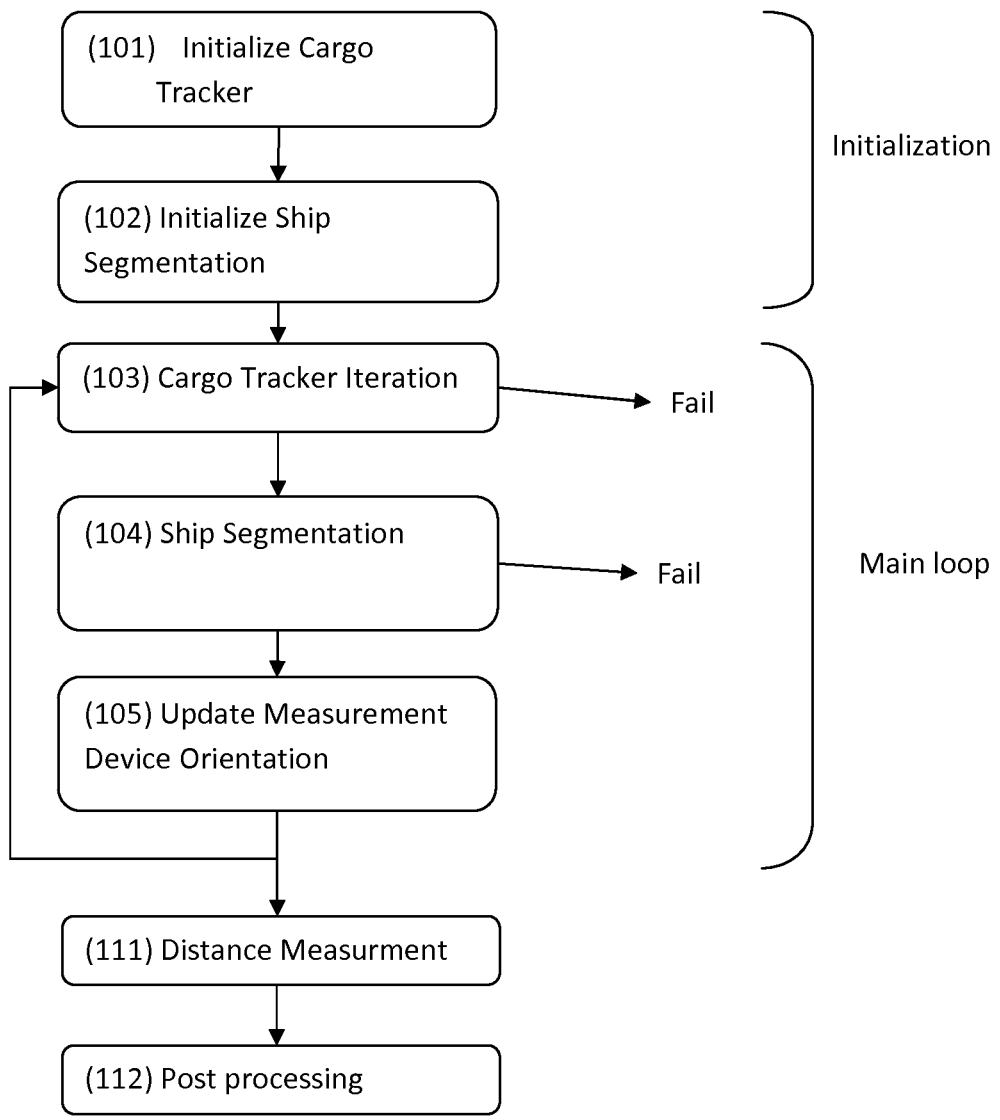
Fig. 9 – Flow chart of adaptive mode

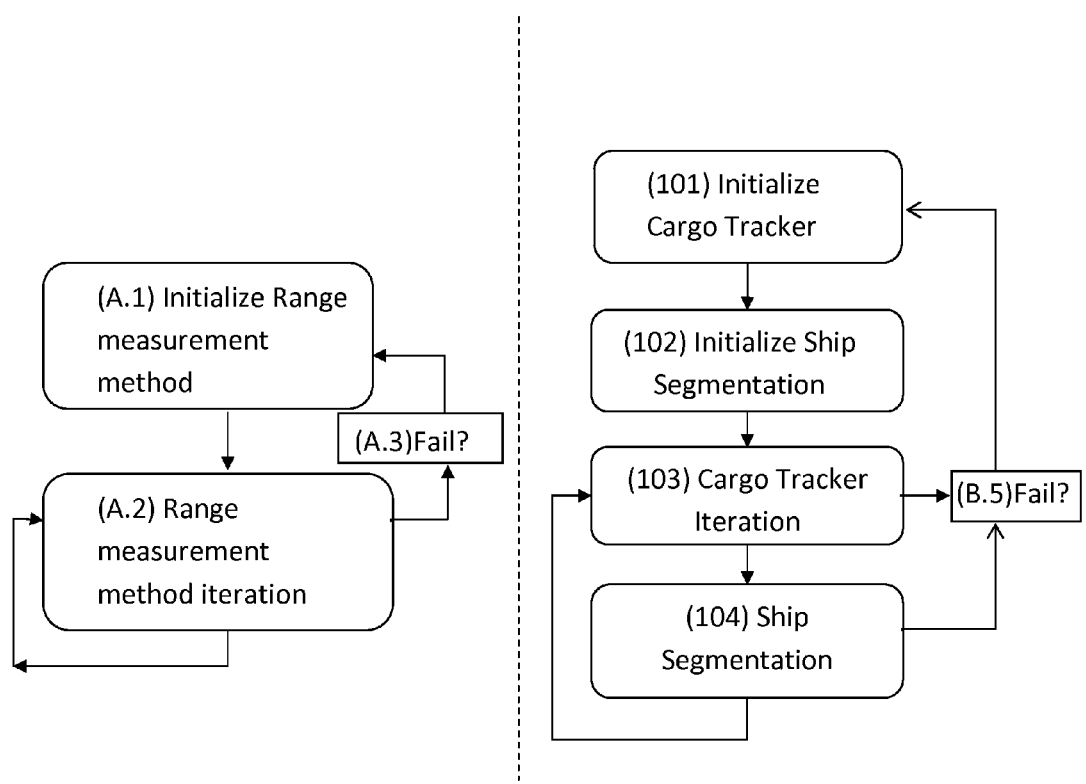
Figure 10 - Flow chart of Main Method 2 – Adaptive Parallel Mode

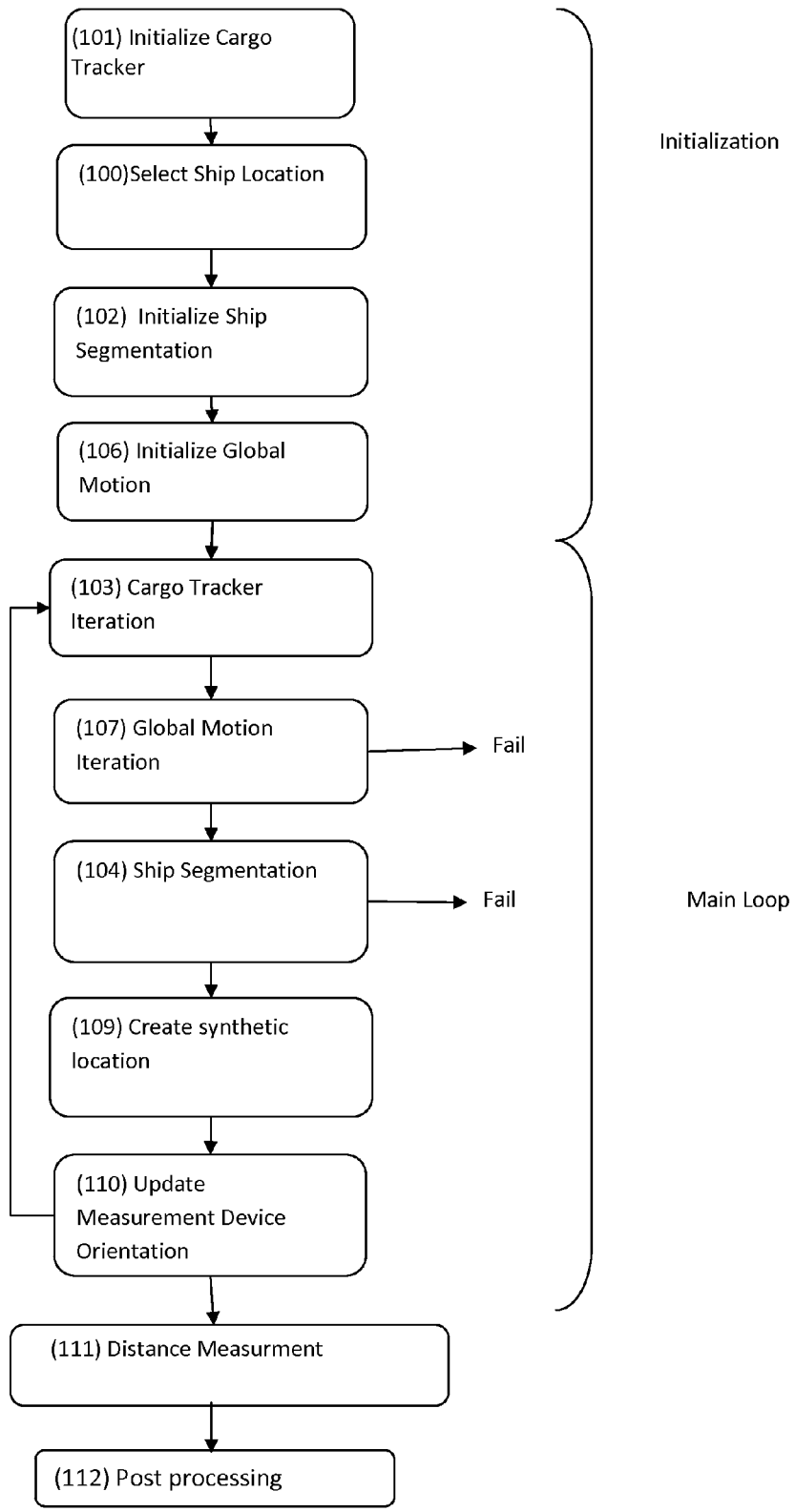
Fig. 11 – Flow chart of fixed location mode

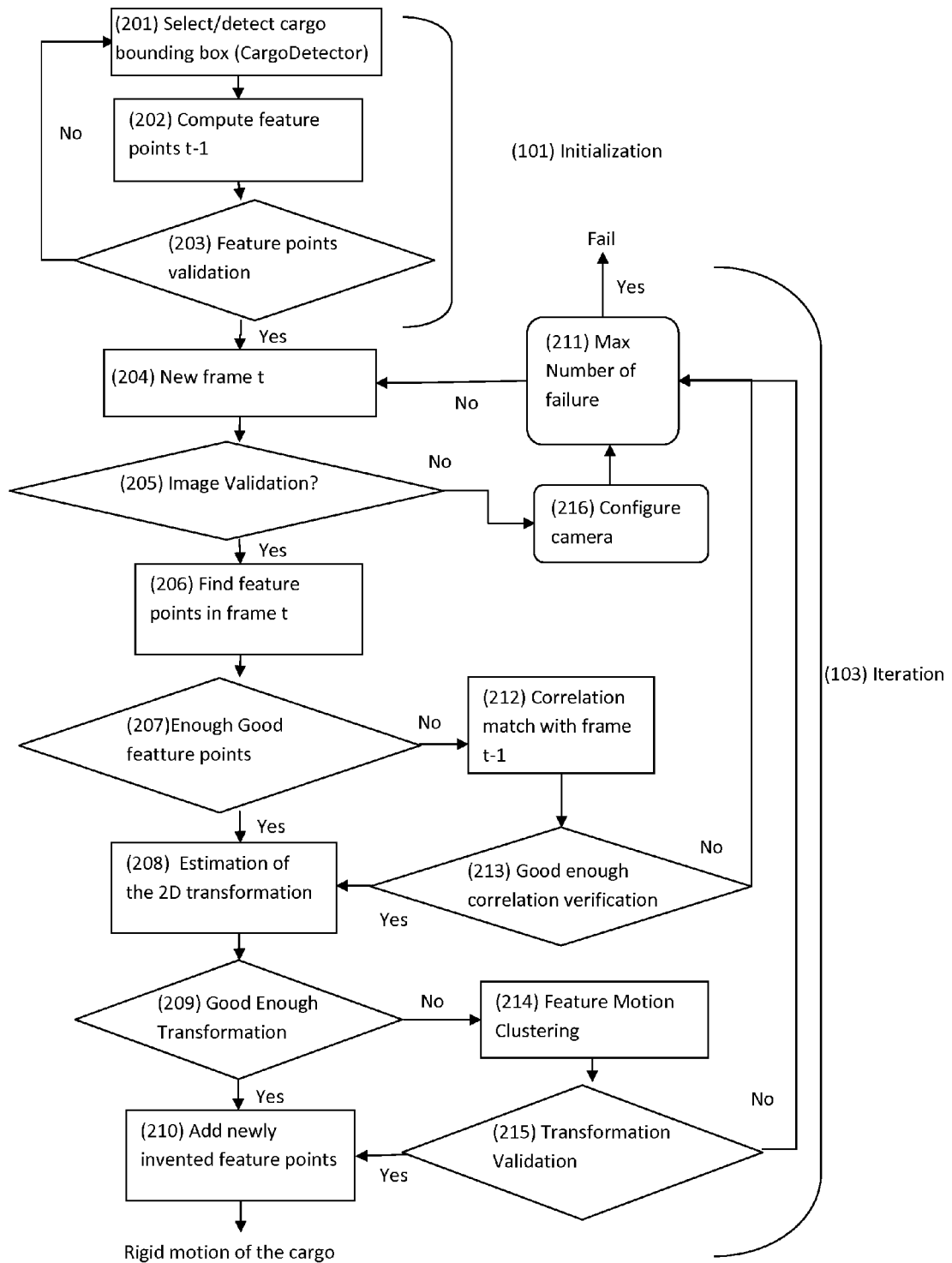
Fig. 12 - Flow Chart of Cargo Tracking Method

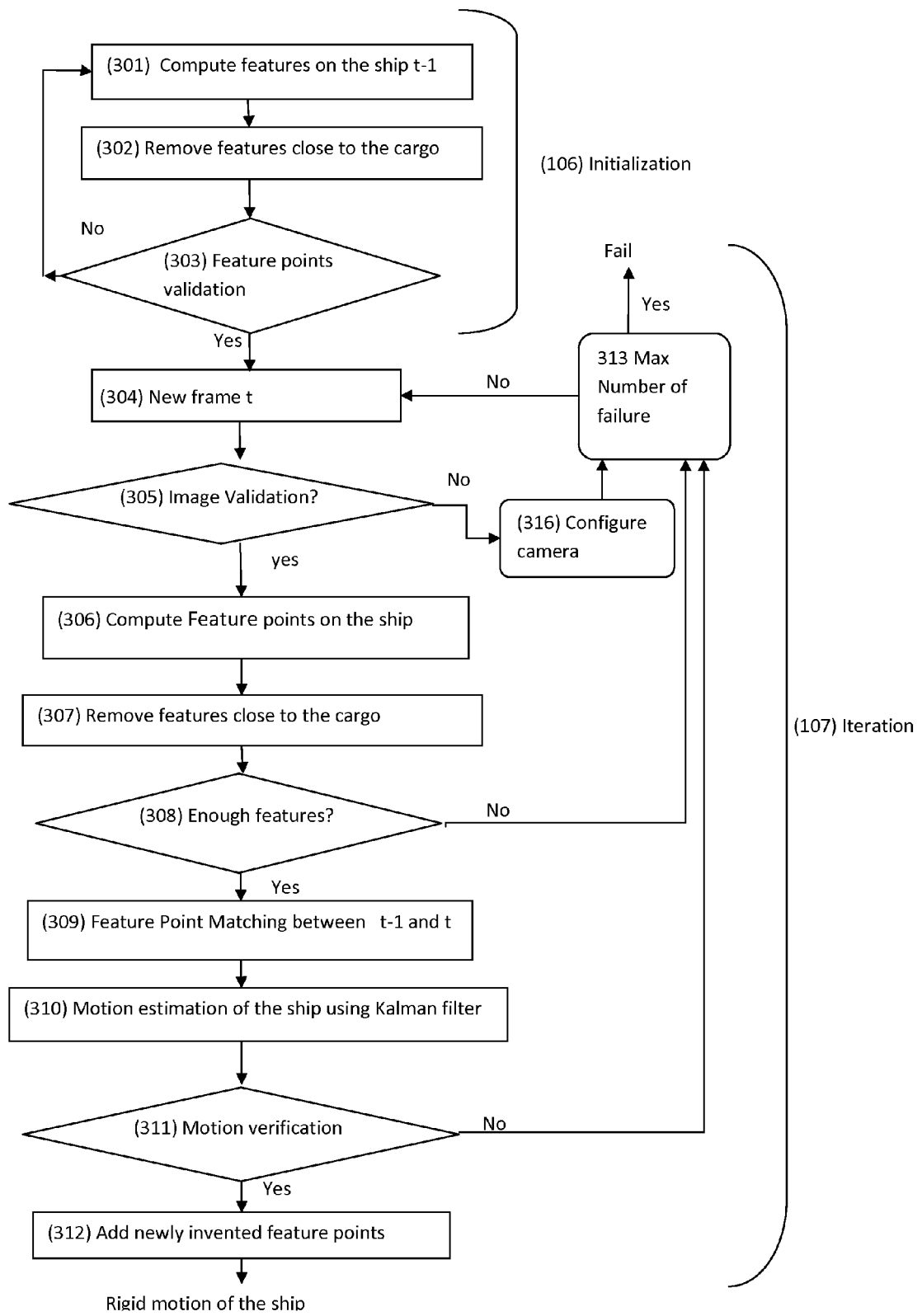
Fig. 13 - Flow Chart of Global Motion Tracking Method

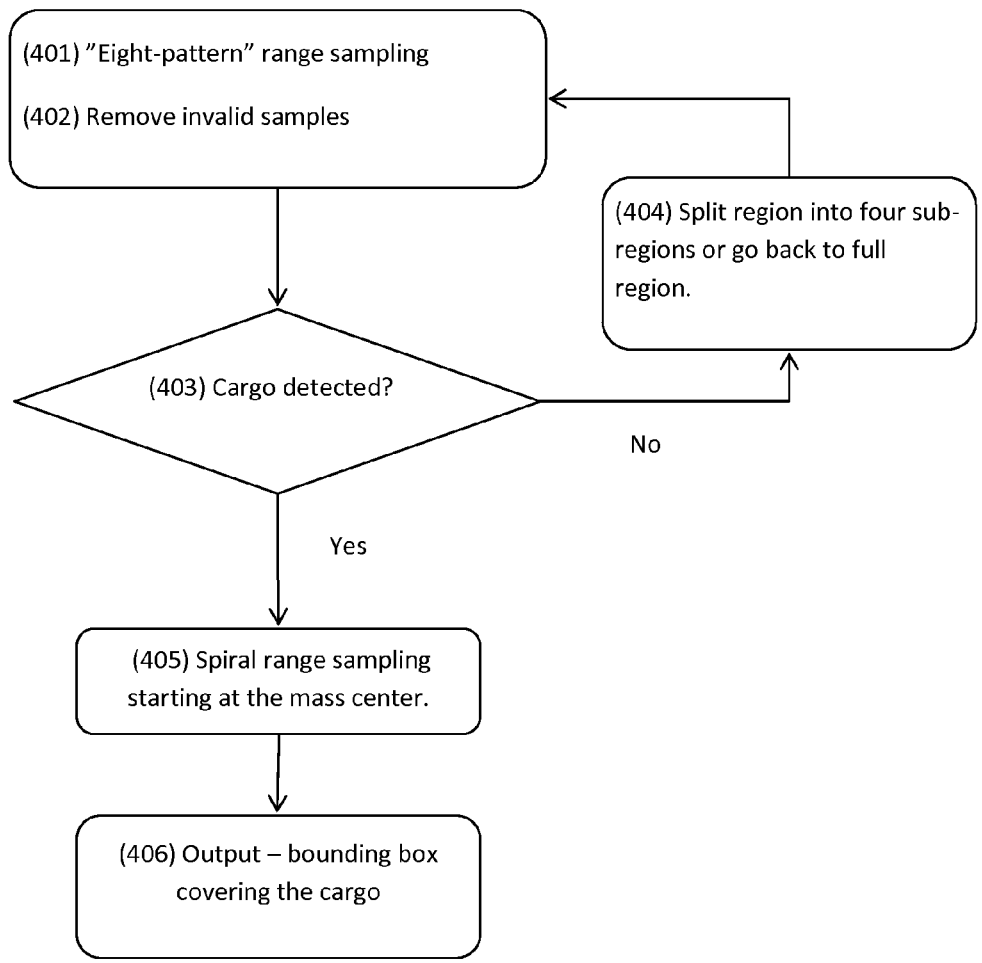
Fig. 14 - Flow chart of Cargo Detection and Localization

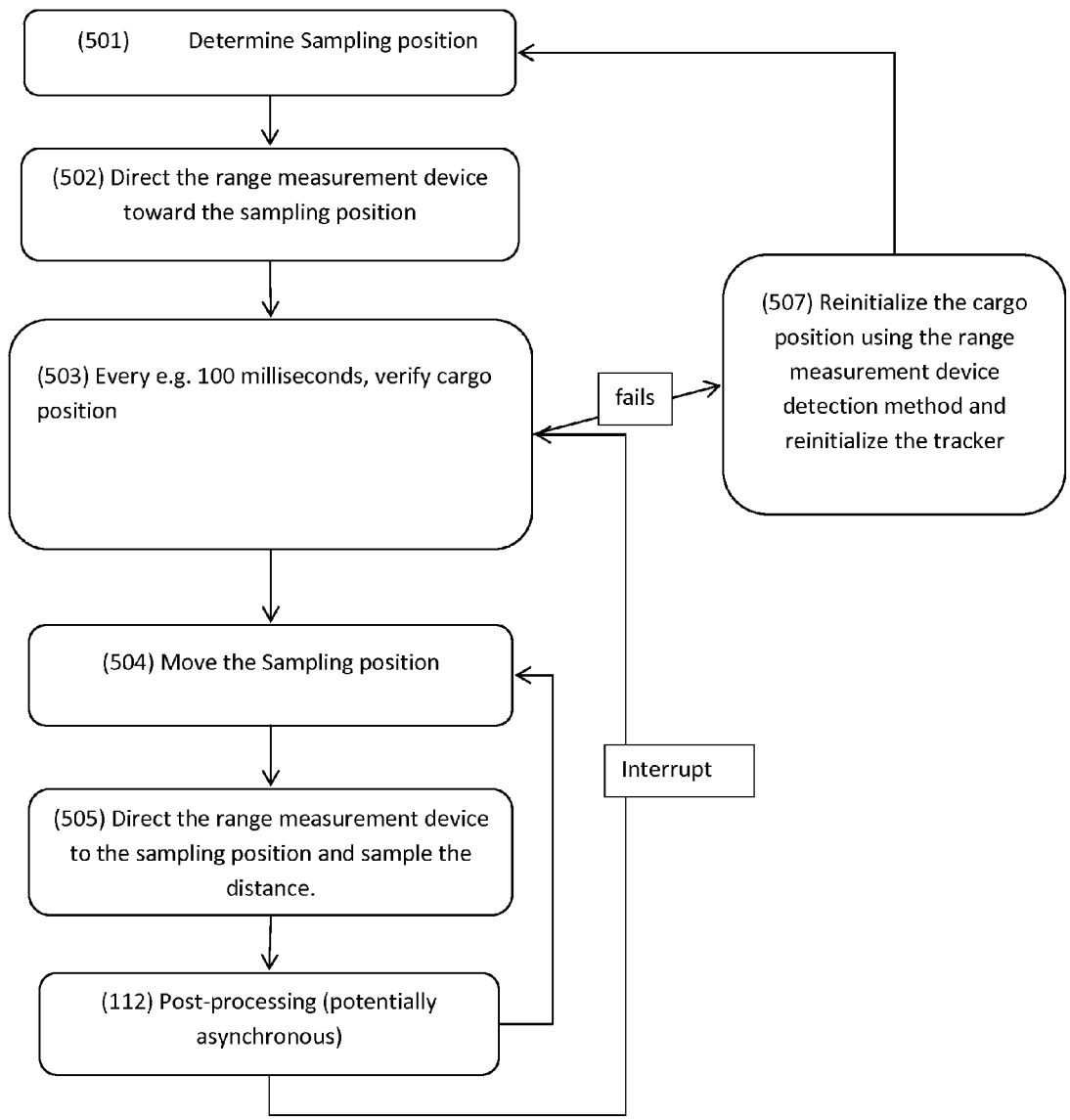
Fig. 15 - Flow chart for Range measurement method with cargo location verification

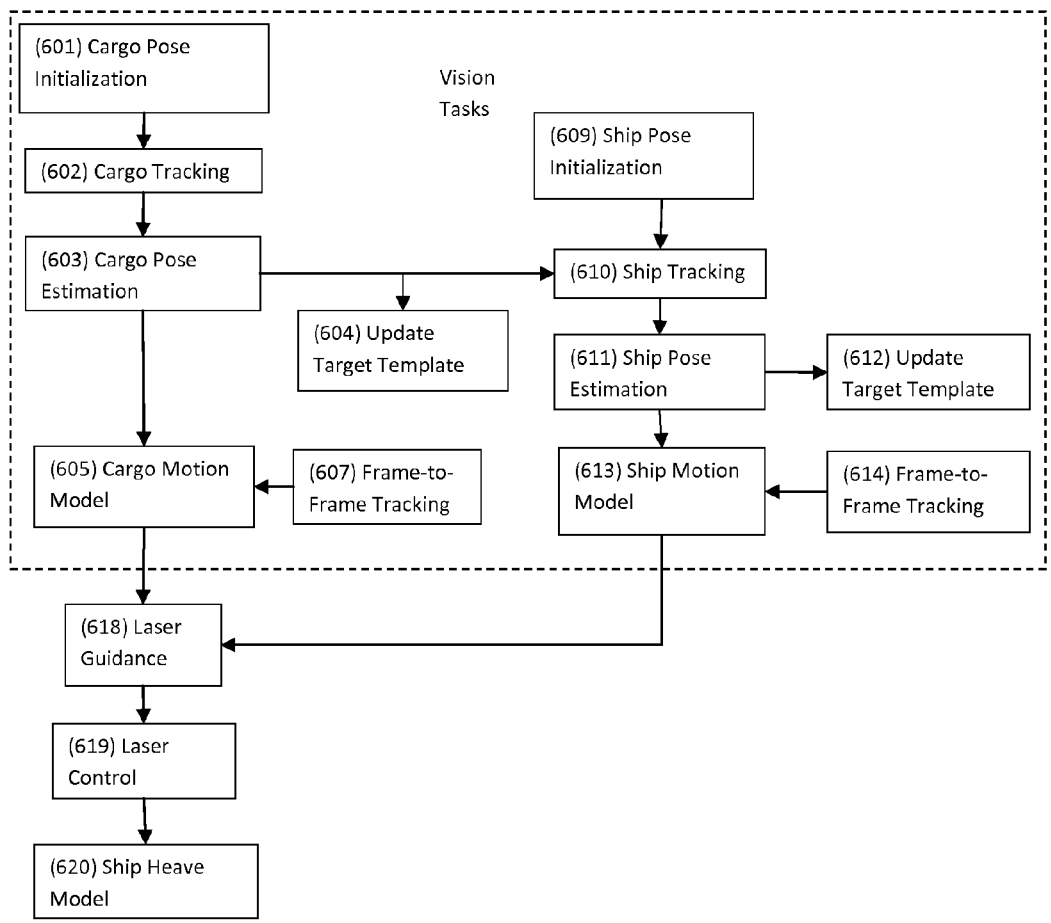
Fig. 16 - Flow chart Overview of the 3D model based tracking of the cargo

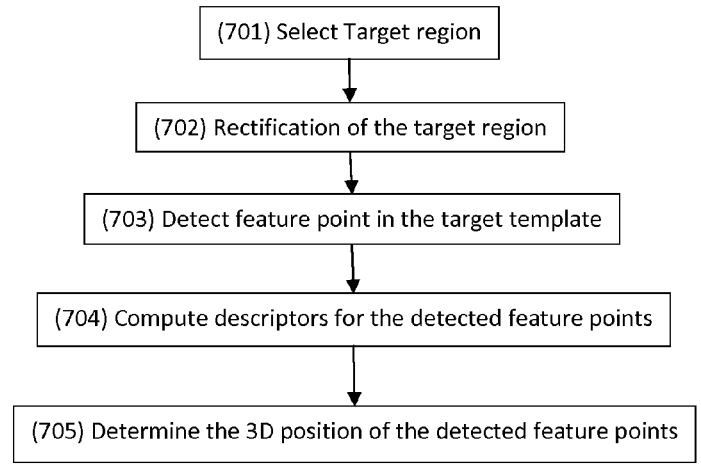
Fig. 17 - Flow chart of Tracking target initialization (cargo or ship)
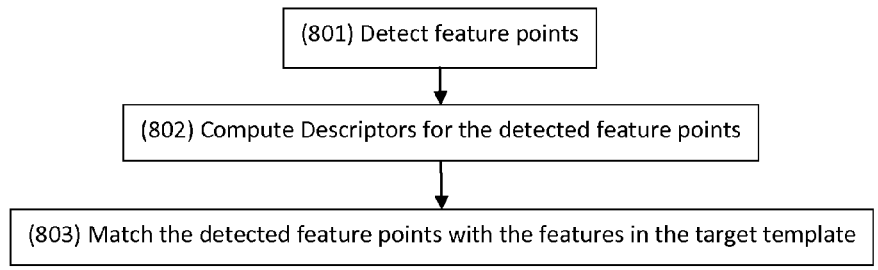
Fig. 18 - Flow chart of Tracking by feature point matching (used for the cargo and ship tracking)

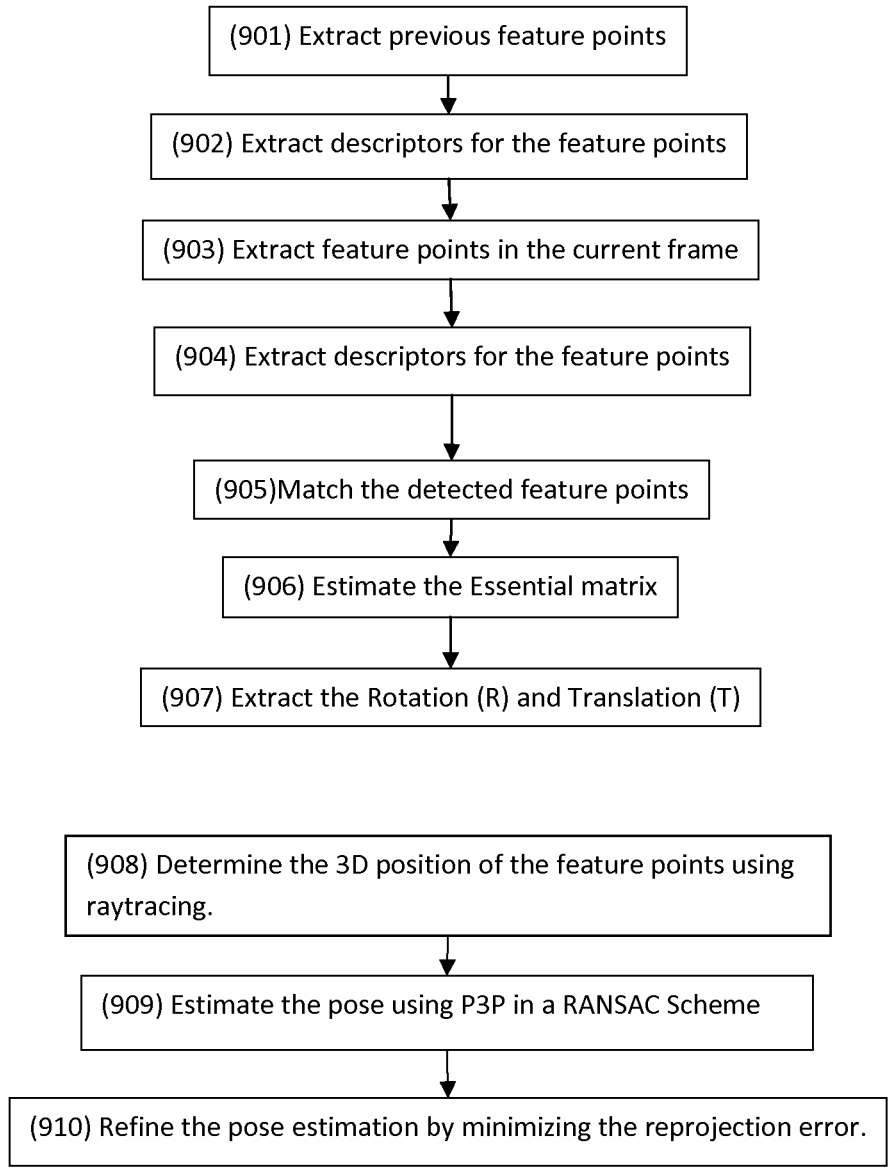
Fig. 19 - Flow chart of Frame-to-Frame cargo tracking

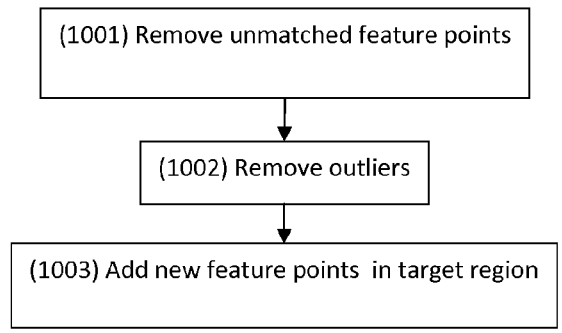
Fig. 20 - Flow chart of Update Target Template
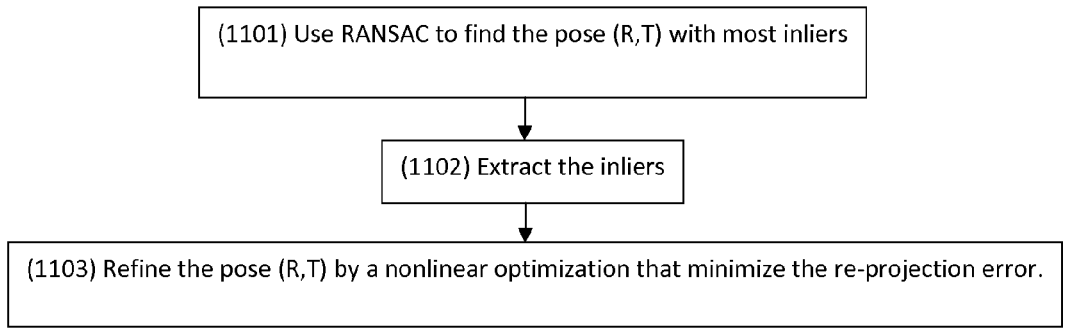
Fig. 21 - Flow chart of Pose estimation used to estimate the 3D position of the cargo and ship

SYSTEM, DEVICE AND METHOD FOR TRACKING POSITION AND ORIENTATION OF VEHICLE, LOADING DEVICE AND CARGO IN LOADING DEVICE OPERATIONS

TECHNICAL FIELD

The present invention generally relates to a system, device and method for loading and/or unloading an object to and /or from a second vehicle where a loading device is mounted on a first vehicle and the cargo is hanging, optionally in a rope or wire, from the loading device. More specifically, the present invention relates to a method and a device for a sensor system (with a sensor platform deployed at the crane tip) well suited io for heave compensation during loading and unloading process of cargo to/from a ship where a crane is mounted on an oil rig.

BACKGROUND OF THE INVENTION

Operating and controlling positioning of multiple objects when the objects change position and orientation individually is a common challenge in everyday life. Specifically complex is this when one object is to be loaded or unloaded to/from a second independently moving object. This is typically seen in offshore cargo loading/unloading scenarios, but can easily be found elsewhere in a wide variety of scenarios such as in space environments when spaceships are to be connected, or in a forest environment when a moving tree-cutting machine loads timber to an individually moving lorry.

Traditionally the task of loading and unloading is handled by skilled operators of crane or other connection system and the use of different warning and measurement systems.

Solutions to the task of loading and unloading in an offshore environment where a boat with a crane is moving under influence of waves, and heave compensation is performed to have a load stabilized even if the crane construction is moving is known to a person skilled in the art.

U.S. Pat. No. 6,505,574 B1 discusses solutions to the problem where a method and system are provided for reducing sea state induced vertical velocity of the crane's suspended load.

U.S. Pat. No. 5,943,476 discusses in some aspects the measurement of the orientation of an object related to positioning robotic end effectors.

Common to most available advanced systems is that they present solutions related to loading and unloading when the crane/operator itself is under influence of motion, and where the task is to compensate and keep the absolute motion of the cargo as stable as possible, or where a system is calculating the orientation of an object for the purpose of further handling by the system.

Standards and specifications in the shipping transport industry put constraints on maximum allowable load weights for loading/unloading under rough sea conditions, and by that increasing the cost factors of loading and unloading cargo between/to/from seagoing vessels. Standards also require that the allowed lifting capacity is reduced based on maximum significant wave-height, making lifting operations less effective when maximum significant wave-height increases.

Problems arise when cargo is to be loaded or unloaded in unstable conditions, such as in turbulent sea states (large waves) and where a loading device mounted on a fixed or floating vehicle, i.e. a crane mounted on an oil rig, is potentially moving independent of the target plane, such as the loading deck on a supply ship moving independently of the crane, and the cargo may be prone to swing out of focus of the guiding systems. These situations, together, partially together or individually, create difficult working conditions for the crane operators, and together with low weight tolerances due to limitations to human capabilities, standards and regulations, these factors increase the amount of work and complexity of loading and unloading cargo.

There is a need for an improved system to provide automatic compensation for the distance variation between the cargo and the plane of which it is loaded or unloaded irrelevant of the movement of the plane itself or the vehicle holding/lifting the cargo, such as the crane mounted on a platform in a crane lifting operation.

SUMMARY OF THE PRESENT INVENTION

It is an object of the invention to provide a method and system for determining a motion of a load object suspended from a loading device of a first vehicle relative to a surface of a second vehicle being movable independently of the first vehicle. To achieve this a measuring device is provided to give an accurate estimation of the distance from the measuring device position considering the distance between the measuring device and the target area on the surface of the second vehicle and optionally the distance between the measuring device and the load object. Continuous monitoring of this distance will reveal motion pattern of both the first vehicle and selected region of the second vehicle.

Another object of the invention is to provide a method and a system for automatic compensation of the vertical motion of the first and second vehicle. The operator operating the load object suspended from a loading device of the first vehicle then do not need to consider the heave components of the crane or of the surface of the second vehicle. The system will continuously compensate for the distance between the load object and the target surface and strive to keep this constant and only change according to the operator commands to lower or raise the load object.

Yet another object of the invention is to present an image of the load object and the second vehicle seen from the measuring device. The crane operator can then pre-select a region of the floor of the second vehicle and the operator and/or the measuring device system will continuously receive reports of the heave of this region. Thus, in an example where one or more of the vehicles are floating objects, accurate value of maximum significant wave height can be calculated.

BRIEF DESCRIPTION OF THE DRAWINGS

FIG. 1 describes a typical setup of the invention where a load object is handled by a crane on a rig and a floating vessel of which the load object is loaded or unloaded.

FIG. 2 is a schematic view from above of the load object, attached to wire above the target area of a ships deck, as seen by the sensor platform located in the crane tip.

FIG. 3 is a schematic side view of the sensor apparatus.

FIG. 4 is a mechanical layout of the sensor platform.

FIG. 5 is a concept drawing showing good and bad feature points.

FIG. 6 is an example of the range movement pattern: "eight pattern"

FIG. 7 is an example of the range movement pattern: "spiral"

FIG. 8 is a side view of a typical floating vessel with container load object

FIG. 9 is a flow chart of Method 1—adaptive mode

FIG. 10 is a flow chart of Method 2—adaptive parallel mode

FIG. 11 is a flow chart of Method 3—fixed location mode

FIG. 12 is a flow chart of the cargo tracking method

FIG. 13 is a flow chart of the global motion tracking method

FIG. 14 is a flow chart of the cargo detection and localization method

FIG. 15 is a flow chart of the range measurement method with cargo location verification.

FIG. 16 is a flow chart of Overview of the 3D model based tracking of the cargo

FIG. 17 is a flow chart of Tracking target initialization (cargo or ship)

FIG. 18 is a flow chart of Tracking by feature point matching (used for the cargo and ship tracking)

FIG. 19 is a flow chart of Frame-to-Frame cargo tracking

FIG. 20 is a flow chart of Update Target Template

FIG. 21 is a Flow chart of pose estimation used to estimate the 3D position of the cargo and ship

DETAILED DESCRIPTION

The embodiments of the invention described here within is to be understood as examples of embodiments only, and the invention is not limited in its scope to the details of the following description or the illustrations made in the drawings and the flowcharts. The invention may be practiced and executed in various ways.

According to the present invention, there are several mechanisms involved in improving the safety and capacity of the loading/unloading processes. The present invention exhibits its new features in environmental conditions where both the loading device on a first vehicle and a surface of a second vehicle are in motion independent of each other, and the load object suspended from the loading device is to be loaded or unloaded to/from the surface of the second vehicle.

The sensor platform includes a camera used for capturing images, which enables the system and/or operator to identify a target position on the ship floor, and/or identify and track the cargo.

The sensor platform further includes a range measurement device which is used to measure the distance between the sensor platform and ship floor, and thus enables the system to compensate for individual movements of the crane, cargo and ship.

Specific terminology will be resorted to for the sake of clarity in the invention description and claims . It is to be understood that each specific term includes all technical equivalents which operate in a similar manner to accomplish a similar purpose.

Camera—Any type of image capturing device, ie. digital, analog, IR, heat dissipation, radar, sonar and others.

Feature point—A feature point is a point in an image which contains a lot of local image structure/information. Common examples are corners and crosses. Common requirement for good feature points are: locally unique, spatial localized and scale invariant. Corners 31 are in general good feature points because they have large intensity differences in two different directions as described by FIG. 5. Corners are also likely to be locally unique and spatially localized. An edge 32, on the other hand, is typically not locally unique and not spatially localized Feature tracking—in feature based tracking, the object to be tracked is represented by a set of detected feature points. To determine the motion of the object, the motion of each individual feature is first computed. Based on the motion of each individual feature point, the motion of the object is determined. A common feature tracking method is Kanade-Lucas-Tomasi (KLT) tracker which is recognized and well known by a person skilled in the art.

Rigid Motion—the motion of rigid body (i.e. a body that does not deform) is composed of rotation, translation and scaling. The rigid motion is in 2D represented as a 3×3 matrix called Euclidian/similarity transformation. The 3×3 matrix representing the similarity transformation has the following form

| S*cos(a) | −S*sin(a) | tx |
|---|---|---|
| S*sin (a) | S*cos(a) | ty |
| 0 | 0 | 1 | and transforms homogenous coordinate by rotating, translating and scaling where a is the rotation angle, S is the rescaling factor and tx,ty are the translation (in x and y directions).

Ship—the term ship is used in a generic way which also includes any type of offshore/floating vessel.

Image segmentation—image segmentation is the process of dividing an image into different parts—such as ship and ocean—often representing different objects.

Outlier—an outlier is an observation that is numerically distant from the rest of the data. Outliers are often indicative of measurement error.

Robust statistic methods—robust statistic methods uses robust estimations which are tolerant to outliers. Few numbers of outliers in the data set does not influence the robust estimation considerably. Methods for robust estimators are recognized and well known by a person skilled in the art.

RANSAC—RANdom SAmple Consensus is a common robust estimation often used in computer vision and well known by a person skilled in the art.

Kalman filter—The Kalman filter is a mathematical method named after Rudolf E. Kalman. Its purpose is to use measurements that are observed over time that contain noise (random variations) and other inaccuracies, and produce values that tend to be closer to the true values of the measurements and their associated calculated values.

PnP/P3P—Perspective-n-Point—Determining the pose of a 3D object based on its 2D image with limited number of reference points.

Occlusion—Occlusion occurs when one object lies between an observer and another object. The closer object occludes the more distant one in e.g. an acquired image. The occluded surface is the portion of the more distant object hidden by the closer object.

Gyroscope—A gyroscope is a device for measuring or maintaining orientation, based on the principles of conservation of angular momentum. A mechanical gyroscope is essentially a spinning wheel or disk whose axle is free to take any orientation. This orientation changes much less in response to a given external torque than it would io without the large angular momentum associated with the gyroscope's high rate of spin. Since external torque is minimized by mounting the device in gimbals, its orientation remains nearly fixed, regardless of any motion of the platform on which it is mounted. Gyroscopes based on other operating principles also exist, such as the electronic, microchip-packaged MEMS gyroscope devices found in consumer electronic devices, is solid state ring lasers and fibre optic gyroscopes, and the extremely sensitive quantum gyroscope.

Inclinometer—An inclinometer or clinometer is an instrument for measuring angles of slope (or tilt), elevation or inclination of an object with respect to gravity. It is also known as a tilt meter, tilt indicator, slope alert, slope gauge, gradient meter, gradiometer, level gauge, level meter, declinometer, and pitch & roll indicator. Clinometers measure both inclines (positive slopes, as seen by an observer looking upwards) and declines (negative slopes, as seen by an observer looking downward).

Optical encoder—an electro-mechanical device that converts the angular position of a shaft or axle to an analog or digital code.

Internal camera parameters—Typically comprises focal length, image centre, resolution, lens distortion parameters (radial distortion, tangential distortion).

Levenberg-Marquardt algorithm—provides a numerical solution to the problem of minimizing a function, generally nonlinear, over a space of parameters of the function.

"Eight pattern" range movement—the pattern that is "painted" by the range measurement device as seen from above as shown in FIG. 6.

Spiral range movement—the pattern that is "painted" by the range measurement device when seen from above as shown in FIG. 7.

Crane control system—a control system controlling the movement of a crane. Uses and exposes input and output parameters such as torque, current wire rope length, wire rope direction and speed, angle positions of joints of the crane etc.

Control engineering—or Control systems engineering is the engineering discipline that applies control theory to design systems with predictable behaviors. The practice uses sensors to measure the output performance of the device being controlled (often a vehicle) and those measurements can be used to give feedback to the input actuators that can make corrections toward desired performance.

Optimization problem—In mathematics, computer science and economics, optimization, or mathematical programming, refers to choosing the best element from some set of available alternatives. In the simplest case, this means solving problems in which one seeks to minimize or maximize a real function by systematically choosing the values of real or integer variables from within an allowed set. This formulation, using a scalar, real-valued objective function (cost function), is probably the simplest example; the generalization of optimization theory and techniques to other formulations comprises a large area of applied mathematics. More generally, it means finding "best available" values of some objective function given a defined domain, including a variety of different types of objective functions and different types of domains.

Mean Squared Error (MSE):

Measure the squared error between an observation (y) and estimation (y')–(y–y')^2. Summation over all pairs of observations and estimations gives the sum of squared error, and divided by the number of observation gives the mean square error. MSE is simply the average squared error computed over a set. The MSE can be used both as an optimal criteria for finding an estimator (i.e. to minimize the MSE) and as method for evaluating an estimator. Replacing the mean (in the definition above) with the median give the median squared error (with is robust to outliers). Replacing the squared error with the absolute difference (i.e. abs(y–y')) gives the Mean Absolute difference (MAD).

Mean Absolute difference (MAD): See Mean Squared Error (MSE).

Segmentation—Dividing an image into different parts, there the different parts correspond to different objects (for example ship and ocean).

Texture segmentation—Segmentation of an image based on differences in the visual appearance—i.e. texture—of the different objects in the image.

Filter based texture segmentation (FBTS)—FBTS is based on the assumption that visual differences (i.e. the texture of the objects) have different statistical properties. By applying suitable filters (which depends on the textures), important properties for separating the objects will be enhanced, while less important visual properties will be suppressed. The image is segmented by comparing histogram of filter responses for the different objects.

Ship/Ocean Segmentation

Dividing the image into regions containing ships and ocean can be done using filter based texture segmentation. The visual appearance of ships and ocean view from the sensor position is very different. The visual appearance of the ocean is a rather large homogenous region with the similar brightness with few or no edges, while the visual appearance of the ship floor is homogenous with a lot of brightness variation and a lot of edges. Filter based segmentation will detect if ships or ocean are present in the image, furthermore it will classify the detected region as ship or ocean. The output of the ship/ocean segmentation is the current location of the ship and ocean. The previous position of the ship/ocean can be used as the starting seed for the segmentation of current frame.

Model Predictive Control, or MPC, is an advanced method of process control that has been in use in the process industries such as chemical plants and oil refineries since the 1980s. Model predictive controllers rely on dynamic models of the process, most often linear empirical models obtained by system identification.

Model Predictive Control (MPC) is a multivariable control algorithm that uses:
an internal dynamic model of the process
a history of past control moves and
an optimization cost function J over the receding prediction horizon, to calculate the optimum control moves.
The optimization cost function is given by:

$$J = \sum_{i=1}^{N} w_{x_i}(r_i - x_i)^2 + \sum_{i=1}^{N} w_{u_i} \Delta u_i^2$$

without violating constraints (low/high limits)
With:
$x_i$=i-th controlled variable (e.g. measured temperature)
$r_i$=i-th reference variable (e.g. required temperature)
$u_i$=i-th manipulated variable (e.g. control valve)
$w_{x_i}$=weighting coefficient reflecting the relative importance of $x_i$
$w_{u_i}$=weighting coefficient penalizing relative big changes in $u_i$ etc.

SLAM—Visual Simultanous Localization and Mapping is a group of techniques to localize an object while simultaneously and building a map of the environment. Visual SLAM normally refers to using one or more cameras as input sensors to estimate is locations and maps.

SFM—Structure From Motion is a group of techniques where multiple images from one or more cameras are used to create 2D or 3D structure.

Stereo vision—is a group of techniques where two or more cameras are used to compute a 3D map/depth map of the scene.

Ray tracing—given the relative pose between a camera and an object, including the internal camera parameters, ray tracing is the process of extending a ray (vector) from the focal point through a given 2D image coordinate. The goal is to find the intersection coordinate (3D) with the object, if it exists.

The system and device of the present invention are described in several operation modes where the system has two main operational modes a and b, and optional modes c and d:
  a) as a decision supporting system for the crane operator that will improve the decision quality of the crane operator under hard circumstances
  b) as a sensor providing heave measurement data to the crane control system which can utilize the information for actively compensation of heave between the two vehicles. The system may also monitor the current safety regulation for crane operation, e.g. at sea, by providing more accurate and correct guiding on maximum allowable significant wave height for each cargo category.
  c) active swing/oscillation compensation
  d) automated control of greater portion of crane operations such as
    i. fetch and load cargo at defined location A
    ii. lift and move
    iii. unload at defined location B The present invention makes use of different tracking methods with the capacity to recover from minor occlusions and temporary missing objects. It is assumed that the is sensor platform 15 with camera is placed above a ship 4 and is looking downward at the ship 4 as shown in FIG. 1. The sensor platform 15 is connected to the crane boom, which means that the sensor platform 15 can be moved in all directions (x, y and z) relative to the ship, but is in general looking down. The orientation of the sensor platform 15 may temporally change, normally due to motion of the crane boom 8, but will quickly, in order of <10 second, return to the downward looking orientation. Crane boom movement can be influenced by the normal operation of the crane, or by non-voluntary movement caused by e.g. tough weather conditions, waves, or other controllable or uncontrollable influences. Alternatively the hinge can be controlled by an active control loop and motors or other driving mechanisms that at all times makes sure that the orientation is as required (e.g. downwards). Output from rotational sensor(s) and/or inclinometer, gyro or other may be used as input to e.g. a servo controller, which again may be used as control input to motors or other driving mechanisms that can control the hinge orientation (orientation of the sensor platform 15). The ship 4 may be visually presented moving along a 2D plane representing the ocean surface 7 as seen in FIG. 2. The visual presentation may consist of one or a plurality of pictures on a monitor, a screen, or similar, and/or as a digital or analog representation that may be used as input to a computer system. The camera operates at predefined numbers of frames per second in order for the movement of the ship 4 in the 2D plane to be small (i.e. not more than a couple of pixels between subsequent frames). The crane boom 8 on the other hand can move faster, causing the 2D position of the ship 4 in the camera images to change fast (i.e. more than a couple of pixels between subsequent frames). The field of view 2 is sufficiently large for capturing a large part of the ship 4. The visual details /feature points 31, 32 on the ship 4 are stationary on the ship, but will move in the camera view when sensor platform 15 and/or ship is moving. Most of the visual details will remain visible in the camera view during the loading/unloading operation. Some minor visual details on ship 4, however, may change —such as moving persons and/or equipment, and/or due to changing light condition etc. A sufficiently large region of the ship 4, i.e. more than 10feature points, is present/visible during the tracking. The point to track may temporally fall out of the captured image or it may be occluded.

FIG. 2 shows an image captured by a sensor platform 15 (e.g. camera) from the position in the crane boom 8, where the boat 4, ocean 7, cargo 3 and line 9 is shown. A potential target location 14 for range measurement is also shown.

The sensor system 1 is shown in more detail in FIG. 3. The Sensor data communication channel 11 can be analog or digital communication, e.g. Ethernet, RS422, RS485, OPC or other data communication protocols, and may carry information both ways. The sensor platform 15 includes system sensors such as a camera, rotational sensors, range measurement device and more, as further described below.

Output information from the sensor system 1 transmitted on the communication channel 11 may comprise position and velocity measurements of the target area relative to the sensor platform 15 (e.g. can be used by the control system of the active heave compensated crane). Output information may also comprise position and orientation of cargo relative to the sensor platform 15 (e.g. can be used by the control system of a crane to compensate for swing and/or for automatic positioning and loading/unloading cargo). Output information may further comprise position and orientation of the second vehicle relative to the sensor platform 15.

Input information to the sensor system 1 received on the communication channel 11 may comprise hook speed, boom azimuth, current wire rope length/speed/direction, radius of crane reach, boom geometry (lengths, joints etc.) including angles of all joints on crane boom (e.g. angle of elbow joint of a knuckle boom crane). In other words, all kinematic information and state of the full, or part of, the geometry of the crane.

Computer(s) 12 runs one or multiple software algorithms and may utilize a multi-processor architecture if comprised by the computer(s) to provide higher performance and the ability to run multiple parallel processes and methods to e.g. verify the results against each other. One or more data interfaces 13 between sensor(s) in the sensor platform 15 and computer(s) 12 are provided for analog or digital communication, e.g. Ethernet, RS422, RS485, OPC, fiber or other. The sensor platform 15 is further described in one possible embodiment in FIG. 4. A hinge 21 with passive damping makes sure the sensor platform 1 is always pointing downwards, and the passive damping system damps vibrations and oscillations. The direction can also be actively controlled by adding e.g. one or a multiple of servo motors (not shown) or driving mechanisms and suitable rotational sensors 28. As an alternative or addition to a rotational sensor, an inclinometer or a gyro or similar may be used to define the actual direction of the sensor platform 1. A mounting-point 22 is provided for attaching the apparatus to the crane boom, and a base bracket 30 provides a "frame" to which the other components are attached. A camera housing 23 provides housing for sensors such as camera (not shown), and/or servo controller, and/or servo driver and/or more (not shown). An inclinometer and/or gyro may be provided inside the camera housing 23 which may be used in addition to rotational sensor 28 or as a replacement for the latter. A second housing 24 is provided for holding range finder (not shown) that can be a single spot laser range finder, a multi-measurement device (e.g. Astech LDM 301A, or other), and other instruments such as rotational sensors, gyros or other. Pan-tilt brackets 26 with axes are provided to enable rotation of range finder by rotating the second housing 24 around two axes. Gears 27 are connected to motors 25 to provide rotational force to the pan-tilt axes. All or some of the components of the sensor system 1 may be put inside one or more separate housings (not shown) of which some or all may be explosion-proof. The positioning between the camera inside the camera housing 23 and base bracket 30 is fixed and will not be altered (i.e. the "center" of the camera and the pan-tilt origin is known and unaltered). The position and orientation of the base bracket 30 may change but the relative position between the camera and the base bracket 30 will be static. Power adapter and controller unit, including motor controllers and drives (typically servo motor) can be mounted inside camera housing 23 or in one or more separate containers (not shown). The camera is in general looking downwards (i.e. the orientation is fixed) but may temporarily diverge from the down-ward orientation when the sensor platform 1 is moved/rotated due to accelerations or vibrations. The pan-tilt device makes the second housing 24 that contains the range finder able to rotate around two axes. The range finder should be directed to the target location 14 on the vessel/ship as defined by the methods described herein.

The adaptive tracking mode is defined by the flow chart in FIG. 9 where the distance to the ship 4 close to the current position of the cargo 3 is determined using a measurement device by following steps:

1. Initialize Cargo Tracker 101—the cargo is detected automatically by Cargo Detector as described by flow-chart in FIG. 14, or the operator manually selects the cargo to be unloaded and a bounding box covering the cargo is determined. The Cargo Tracker initialization procedure is described in more detail in FIG. 12.
2. Initialize Ship Segmentation 102—the ship 4 must be segmented in order for the io measurement device to always be directed toward the ship 4(and not toward the ocean 7).
3. Cargo Tracking Iteration 103—the current position of the cargo is determined as described below in the Cargo Tracker Method.
4. Ship Segmentation 104—the current location of the ship is determined.
5. Update measurement device orientation 105—the orientation of the measurement device is updated such that it is directed toward a position on the ship close to the current position of the cargo.
6. Distance Measurement 111—the current distance to the location on the ship is reported. If the currently reported distance is equal to or close to the wire rope length, it is assumed that the measurement erroneously was performed against the cargo in the wire rope. In this case, the measurement device orientation will be moved further away from the last known cargo position to measure the distance to the ship floor. This process is repeated until a valid distance measurement is made, or after a maximum number of failures, the resulting distance measurement will be treated as invalid.
7. Perform post-processing 112 as described below. Post processing might be processed asynchronously in a separate thread.

When failing cargo- or ship tracker iteration 103, the procedure may jump to step 101 to re-initialize and use the Cargo Detector as described below and by the flow chart in FIG. 14 to automatically locate the cargo.

In case the selected location on the vessel is outside the image border as seen from the camera, the 2D coordinate can still be estimated using the movement of other feature points 31, 32 on the vessel 4. Additionally, the boom axis angles from the crane control system can be used to estimate the position of the selected location outside the camera image, and hence the direction of the range measurement can still be updated.

The adaptive parallel tracking mode is defined by the flow-chart in FIG. 10 where the distance to the ship 4 close to the current position of the cargo 3 is determined using a range measurement device and a camera. Verification of cargo position is performed at given intervals using the range measurement device.

Post processing 112 may include models and prediction of heaves utilized to filter the measurements, e.g. compare, adjust, remove and interpolate measured values according to modeled values, and to add data when the target tracking or distance measurements fails for one or more iterations. Post processing may also include predicting future values based on historical measured values and models. Using a model that describes the heaves will make it possible to continually report the relative velocity between the cargo and the ship floor, even if some data from the range measurement device is invalidated. This approach is often known as Model Predictive Control.

The adaptive parallel tracking mode method runs two parallel processes that exchange information during execution. Thread A is performing the actual range measurements, and also verifies the location of the cargo 3 provided by thread B. Thread A can also internally launch a new thread or asynchronous task for post-processing range measurement results, as described below. Thread B performs the cargo- and ship-tracking based on 2D vision methods. Thread A relies on Thread B to retrieve current cargo- and ship-position to verify its position using one or more range measurements. Both thread A and B relies on the range measurement-based cargo detection method as described below and in the table in FIG. 14 to initialize and re-initialize from failure automatically.

Thread A:
1. Initialize Range measurement method A.1 (described in FIG. 15).
2. Perform range measurement iterations A.2 and cargo location verification iterations (described in FIG. 15). Repeat step 2 when finished
3. If failure A.3, go to step 1 and re-initialize Thread B:
1. Initialize Cargo Tracker 101—the cargo is detected automatically by Cargo Detector as described by flow-chart in FIG. 14, or the operator manually selects the cargo to be unloaded and a bounding box covering the cargo is determined. FIG. 12 contains a detailed description of the Cargo Tracker initialization procedure.
2. Initialize Ship Segmentation 102—the ship must be segmented so that the measurement device always is directed toward the ship (and not toward the ocean).
3. Cargo Tracking Iteration 103—the current position of the cargo is determined as described in FIG. 12.
4. Ship Segmentation 104—the current location of the ship is determined.
5. If failure B.5—go to step 1 and re-initialize In case the selected location on the vessel 4 is outside the image border as seen from the camera, the 2D coordinate can still be estimated using the movement of other feature points 31, 32 on the vessel. In addition the boom axis angles from the crane control system can be utilized to estimate the position of the location outside the camera image, and hence the direction of the range measurement can still be updated.

The fixed location mode is defined by the table in FIG. 11 where the distance to the ship 4 on a selected location on the ship 4 is determined using a measurement device by following steps:

1. Initialization of the Cargo Tracker 101—the cargo is detected automatically by Cargo Detector as described by flowchart in FIG. 14, or the operator manually selects the cargo to be unloaded and a bounding box covering the cargo is determined. FIG. 12 contains a detailed description of the Cargo Tracker initialization procedure.
2. Select Ship Location 100—the crane operator pre-select a location on the ship, or the location is selected automatically based on the cargo position. The selected location will be tracked and the current distance to the location will be reported in the subsequent steps.
3. Initialization of the Ship Segmentation 102—the ship must be segmented so that the measurement device always is directed toward the ship (and never toward the ocean).
4. Initialization of the Global Motion 106—FIG. 13 contains a detailed description of the procedure.
5. Cargo Tracking Iteration 103—the current position of the cargo is determined. See FIG. 12-15 for details.
6. Global Motion Iteration 107—the current position of the ship is determine using solely feature points on the ship (i.e. feature points near the current position of the cargo is disregarded). See FIG. 13 for details.
7. Ship Segmentation Iteration 104—the current location of the ship is determined.
8. Create Synthetic Location 109—if the previous location has been occluded by the moving cargo, a new location must be created. A location containing enough good feature points near the previous location is constructed and the newly invented location will be tracked in consecutive frames (i.e. until the new location will be occluded).
9. Update Measurement device orientation 110—the orientation of the measurement device is update such that it is directed toward the selected location on the ship.
10. Distance Measurement 111—the current distance to the selected location is reported. If the currently reported distance is equal (within some slack) to the wire rope length, it is assumed that the measurement erroneously was performed against the cargo in the wire rope. In this case, the measurement device orientation will be moved further away from the last known cargo position to measure the distance to the ship floor. This process is repeated until a valid distance measurement is made, or after a maximum number of failures, the resulting distance measurement will be treated as invalid.
11. Perform post-processing 112 as described above. Post processing might be processed asynchronously in a separate thread.

When normal operation fails, "recovery mode" is initiated and executed. In the case of failure from cargo tracker 103 and/or ship segmentation 104 and/or global motion 107 during iteration, the update measurement device orientation 110 can still be performed by utilizing rotation sensor 28 and/or inclinometer and/or gyro 29 and/or boom axis 8 rotation angles from the control system, to control the orientation of the range measurement device. By assuming that the cargo 3 and/or ship/vessel 4 are stationary for a limited amount of time, the sensor information can be fed directly into e.g. a servo controller which will update the measurement device orientation in "recovery mode". The recovery mode can be aborted if any of the crane axes are being rotated or the hosting rig/ship/platform rotates/moves, and can be run for e.g. 2-3 seconds while the vision methods 102, 106 are trying to detect cargo and ship in new incoming images.

A method for tracking cargo in the wire is described in flowchart in FIG. 12 in the following steps where input to the procedure is the current frame and the rigid motion of the cargo between t−1 and t is the output, where the image and feature points from the previous frame are stored and denoted t−1, and image and feature points of current frame is denoted t:

1. Manually extract a bounding box around the cargo 201, or use the Cargo Detector 401, 402, and 403 in FIG. 14 to find the cargo. The center of the bounding box is assumed to be the center of the cargo.
2. Compute feature points on the cargo 202. To avoid boundary problems only features well inside the bounding box will be considered.
3. Feature point validation 203 decides whether enough good feature points have been found in the bounding box. If enough good feature points cannot be found on the cargo then it cannot be tracked. Success: go to step 204. Failure: go to step 201 or fail.
4. A new frame t is collected/provided 204. The image and feature points from the previous step are stored and denoted t−1.
5. Image validation 205 decides whether the image is good enough for further processing. Basic image quality measurements for detection of bad image quality due to for example motion blur and/or over/under exposure. Success: go to step 206. Failure: go to step 216.
6. Find the feature points found in the previous image (t−1), in the current image t 206. Some of the feature points present in image t−1 may not found in image t.
7. Estimate if enough good features was found 207. Was the number of feature found enough for estimating the motion of the cargo between the two frames? Yes: go to step 208. No: go to step 212.
8. Estimate the 2D motion 208 (rotation and translation) between t−1 and t using the matched feature points and a Kalman filter. The estimation is computed using robust statistic methods such as RANSAC (i.e. a few outliers in the data set have little influence on the estimation).The estimation is a 3×3 matrix that represent the rigid transformation of the cargo (in most cases a rectangular container).
9. Verify whether the transformation against the movements of the individual feature points between t−1 and t 209 is acceptable, e.g.: The Mean Squared Error (or the Median Squared Error), MSE, is sufficiently small. Sufficiently small can in one example be 30 cm, defined in terms of centimeters in world distances (computed using the number of pixels, estimated distance to cargo and internal camera parameters) Success: go to step 210. Failure: go to step 214.
10. Add newly invented feature points 210 within the current bounding box of the cargo. Some features may be lost during the cargo tracking, therefore it is necessary to add new feature in each step.

11. Is Max number of failure 211 reached? The recovery strategy is to collect a new image. This can only be done a limited number of times without a successful tracking. Once the maximum number of new frame is reached the system has failed and the user must once again indicate the cargo. Max number of failure can be e.g. 100.
12. Correlation 212 is a recover strategy used if too few features are found and matched for determination of the current position of the cargo. The last known location of the cargo can be correlated with the current image to detect and determine the current position of the cargo.
13. Correlation validation 213 decides whether the recovery strategy was successful. Success: go to 208. Failure: go to 211.
14. Feature Motion Clustering 214 is a recover strategy used if the feature points are moving inconsistently. May recover in the case when some feature points has been detected on the ship instead of on the cargo. This will result in two types of feature point motion: one set of feature points that are moving along with the cargo and one set which are moving along with the ship. By clustering the feature motion into two clusters, the motion of the cargo can be determined.
15. Transformation validation 215 decides whether the feature motion clustering recovery was a successful strategy. Success: go to 210. Failure: go to 211.
16. Camera configuration 216 optimization method /procedure as described below
17. Output comprise the rigid motion (i.e. 3×3 matrix) of the cargo between frame t−1 and t.

It is additionally possible at every iteration to verify the result from the cargo tracker by comparing the size of the cargo bounding box (the smallest possible rectangle that surrounds the cargo) and reported length of the wire rope at the given iteration with the estimated 2D dimension given the startup dimensions, the internal camera parameters and the startup wire rope length.

Camera configuration optimization method/procedure is used to provide the best configuration parameters for the camera during the current circumstances at any given time. This means that the exposure settings and shutter time is adjusted to provide the best image details for the tracking methods. The configurable parameters may also include a zoom factor. When starting the procedure, a multitude of preset configuration parameters such as, but not limited to, shutter times and exposure settings are used on io the camera, and one or more image is sampled with every set of preset configuration parameters. The resulting images are run through a set of methods with the goal to find the image with the best characteristics for tracking. This is a procedure well known to a person skilled in the art, and examples of methods to optimize towards are:

1. 90 percent of the pixels should be non-saturated (e.g. less than 250 in a range from 0-255)
2. Maximum number of features points detected The set of configuration parameters that achieved the best image(s) is chosen as the current settings. This procedure can be run continuously in parallel with the other methods described in the present invention.

A method for tracking the global motion of the vessel/ship relative to the camera 2D image is described by the flowchart in FIG. 13 in the following steps where input to the procedure comprise information of current position of the cargo, ship segmentation and gyro/inclinometer and the rigid motion of the ship between frame t−1 and t is the output:

1. Compute feature points on the ship (t−1) 301. Only feature points far from the boundary of the ship will be accepted to avoid boundary problems.
2. Remove features close to the cargo location 302 where feature point near the current position of the cargo will be disregarded. The current position and orientation of the cargo will be covered by a circle or a bounding box and only feature point outside the circle or bounding box will be considered.
3. Feature point validation 303 decides whether enough good feature points have been found on the ship. If enough good feature points cannot be found on the container then the ship cannot be tracked. Success: go to step 304. Failure: go to step 301 or fail (potentially trigger new ship segmentation, and cargo detection initialization).
4. A new fame t is collected/provided 304. The image and feature points from the previous step are stored and are denoted t−1.
5. Image validation 305 decides whether the image is good enough for further processing. Basic image quality measurements for detection of bad image quality due to for example motion blur and/or over/under exposure. Success: go to step 306. Failure: go to step 316.
6. Compute feature points on the segmented ship (306).
7. Remove feature points that are too close to the current cargo position (307).
8. Decide whether enough good feature points were found 308. Decide whether enough good feature points were found to determine the motion of the ship between frame t−1 and t. E.g. a minimum number of good feature points might be 10. Success: go to step 309. Failure: go to step 313.
9. Match the feature points found in t with those found in t−1 309.
10. Estimate the 2D rigid motion between frame t−1 and t using matched feature points 310. A robust statistic method—such as RANSAC—is used to compute the optimal rigid motion between frame t−1 and t. Kalman filtering is used for recursive motion estimation.
11. Verify 311 the rigid transformation against the movements of the individual feature points, i.e. The Mean Squared Error (or the Median Squared Error), MSE, is sufficiently small. Sufficiently small can in one example be 30 cm, defined in terms of centimeters in world distances (computed using the number of pixels, estimated distance to cargo and internal camera parameters). Success: go to step 312. Failure: go to step 313.
12. Add newly invented feature points 312 on the ship positioned far "enough" away from the current position of the cargo. Some feature points may have been lost during the ship tracking. Therefore it is necessary to add new features in each step.
13. Decide whether max number of failure is reached. The recovery strategy is to collect a new image. This can only be done a limited number of times without a successful tracking. Once the maximum number of new frame is reached the system has failed and the method most be re-initialized by the crane operator. Max number of failure is preset to a suitable number.
14. Camera configuration 316 optimization method as described above (may be continuously executed in a parallel process).
15. Output of the process comprises the rigid motion (i.e. 3×3 matrix) of the ship between frame t−1 and t.

A method utilizing the range measurement device for Cargo Detection and Localization of cargo hanging in the wire rope within the field of view of the range measurement device mounted on the pan-tilt platform is described by the flow chart in FIG. 14 in the following steps where input to the procedure comprise information of current wire rope length and a 2D bound box covering the cargo is the output:

1. Scan 401 the field of view/scanning region 2 with the range measurement device and pan-tilt base using an "eight-pattern" sampling path.
2. Remove samples 402 that are further away the expected z-distance of the cargo (calculated as a function of e.g. the current wire rope length).
3. Decide whether the cargo was detected 403. E.g. compare sampled distances with wire rope length. If the cargo was detected go to step 405, otherwise go to step 404.
4. Split the field of view 404 (sampling region) into 4 sub-regions and go to step 1 for each region. If sub-region size is smaller than a threshold (e.g. 1/16 of field of sensor field of view 2), abort and fail method.
5. Spiral range sampling starting at the center of mass 405 defined by the feature points found on the cargo. Sampling until one full lap without any new feature points on the cargo has been found.
6. The output of the algorithm is a 2D bound box covering the cargo 406.

In addition to the method described by the flow chart in FIG. 14, it is further possible to automatically detect the cargo when the cargo is located in a target area e.g. ship floor. This is possible by e.g. light-projection onto the cargo, by projecting an illuminated pattern, adding a visual marker (e.g. a known object) onto the cargo or other. The sensor system can then perform standard pattern recognition methods based is on images from the camera to identify the cargo. Another alternative is to change the direction of the range measurement device in a way that scans the entire area and analyses the sampling positions and camera images to detect all cargo within the sensor field of view 2. After this step it is possible to define a strategy for selecting detected cargo to be tracked, e.g. starting in upper left corner of the sensor field of view 2. Other selection strategies may be applicable, e.g. the detected cargo closest to the center of the view. This way the cargo identification may be automated also when the cargo is located on e.g. a ship floor or on an area on e.g. an oil rig.

A method that performs continuous range measurements and that also verifies the cargo location at specified intervals using information from the Cargo Tracker Method described above and in FIG. 12 to verify and update the current direction of the range measurement device is described by the flow chart in FIG. 15 where input to the procedure comprise current position of the cargo, a bounding rectangle covering the cargo and the current ship position/segmentation info:

1. Determine a sampling position 501 outside the cargo but on the ship floor. The sampling point is defined relative to the position and orientation of the cargo and not as a fixed position on the ship floor.
2. Direct the range measurement device toward the sampling position 502 and start sampling.
3. At every predefined time interval (e.g. 100 milliseconds):
    i. Get the current position of the cargo from the 2D camera-based cargo tracker and ship tracker (normally available in a parallel thread executing the trackers)
    ii. Define a line between the current sampling point and the current (center) position of the cargo.
    iii. Sampling along the line until the cargo has been detected or until the measurement device has been directed toward the center of the cargo.
    iv. Verify the cargo position 503 (i.e. the check that difference in measured distance and the current wire length is less than e.g. 2 meters).
4. Move the sampling position 504 according to the motion of the cargo such that the relative position of the sampling point is kept. Adapt to keep the sampling point on the ship (not the sea).
5. Direct the range measurement device 505 at the position and sample the distance.
6. Perform post-processing 112 as described above. Post processing might be processed asynchronously in a separate thread. Go to 504 if predefined time interval has not elapsed, otherwise go to 503.
7. If verification of the cargo fails 507 the cargo position is reinitialized using "Cargo Detection and Localization Method" as described above and in FIG. 14, and the localization of the cargo is then used to reinitialize the 2D camera-based cargo tracker.

When one of the main methods as described above for range measurement has performed one or more iteration, the resulting range measurement can be processed and filtered.

Range measurements will be performed at a preset interval, typically every 5-20 ms. The crane boom 8, the sensor platform 1 and the floating vessel 4 will move independently. This in addition to mathematical and mechanical inaccuracies in directing the range measurement device at all times to the exact same location, might cause the actual target of the measurements to shift between range sampling targets. The actual target might shift between e.g. the floor of the vessel 42 and the top of a cargo/container/structure 41 if the target location on the vessel is too close to the edge of e.g. a container as shown in FIG. 8.

The main outcome of the system is the vertical velocity relative between the crane boom 8 tip and a target location 14, 42 on the vessel, which means that the range estimates that deviate more than what is regarded as "normal" can be filtered out. The relative velocity is change of range per second, meaning that if there is a large change of distance between samplings, the changes will appear as "spikes" in the data series. Standard filtering techniques and/or model prediction well known to a person skilled in the art may be applied to reduce or remove the spikes and use synthetic/predicted data instead of filtered out data. The system will hence be robust to inaccurate targeting of the range measurement device.

Given a position in an image from the "camera 2D coordinate" or pixel coordinate, it will be useful to compute the (3D) world coordinate of the point by the following input, steps and functions where the camera position relative to the pan-tilt arrangement is fixed. In order to accomplish the transformation of a 2D coordinate into an estimated 3D coordinate, we need to know the fixed transformation between camera and pan-tilt unit, the current orientation of the range measurement device, the range to the target reported by the range measurement device, the 2D camera coordinates, including internal camera parameters, and the orientation of the sensor platform (normally io assuming that it is pointing directly downwards).

This allows an approximate measurement of the vertical distance between the sensor platform and the target beneath, which again allows the calculation of the estimated 3D coordinate of the given position in the 2D image.

One possible mapping/transformation is suggested below. The method and function can be achieved by other methods known to the person skilled in the art.

Let P=[Px, Py, 0] be normalized pixel coordinates defining pixel coordinates in the camera lens.

Let D be an estimate of the distance from the camera focal point to the 3D position (last known distance or initial guess).

Let Cp be the position of the camera in world coordinates.

Let Cx, Cy og Cz be unit vectors giving the positive x, y, and z-axes of the camera (right, up and away).

Let Cf be the focal length of the camera.

Let Lp be the center of rotation for the distance measurement device.

Let V be the 3D position in world coordinates calculated based on pixel P and distance D.

$$V = Cp + \text{nomalize}(Cx*Px + Cy*Py + Cz*Cf)*D$$

We can now compute the direction of the measurement device from the device position towards the world coordinate, L:

$$L = \text{normalize}(V - Lp)$$

According to one possible embodiment of the present invention, as described in FIG. 1, the present invention is able to improve the parameters presented to the crane operator for operating the crane and thus improve both the loading and unloading operation process and the safety during this process.

FIG. 1 further illustrates the typical setup with the present invention, where the sensor platform 15 is mounted in the tip of the crane boom 8, pointing downwards towards the floating vessel 4 and the cargo 3 with a defined field view/line of sight 2. The crane 5 is is mounted on an oil rig 6 operating in an offshore environment at sea 7 (with waves). The cargo 3 is attached to the rope/wire 9 by a hook arrangement 10 hanging down from the crane boom 8 tip. The system will also function well for e.g. knuckle-boom cranes.

An image sequence as seen in FIG. 2 captured by the camera 1 is presented to the crane operator. The sequence shows the ship 4 under the crane boom 8 tip in real-time.

The heaves on a target location 14 of the ship floor 4, or a region close to the cargo 3 connected to the crane with the wire 9, should continuously be measured and reported. Especially the vertical velocity of the target location 14, the heaves, should be reported to crane operator or crane control system in real-time.

Both the rig/ship/platform 6 where the crane 5 is located and the rig/ship/platform 4 where the cargo 3 should be loaded or unloaded are (possible) subject to heaves. The system monitors the composed heaves between the two ships/platforms—i.e. the relative heaves between the crane 5 and the rig/ship/platform 4.

The crane operator selects a target location 14 on ship floor which will be traced, and heave parameters associated with the target location 14 is measured. The operator can otherwise choose to select the cargo, which will make the system track the cargo, and measure the heave on the ship floor 4 at a position close to the cargo as seen by the sensor platform 15.

The range measurement device 24 continuously measures the heaves around the selected target position (tracking target location 14 on ship floor or tracking cargo 3). The velocity of the heaves is shown to the crane operator in real-time. Constraints due to regulations may also be presented to the crane operator.

Failure to measure the heaves, for any reason, when repeated a definable number of times is actively reported to the crane operator.

In another embodiment of the invention, the active heave compensation mode provides relative velocity between the floating vessel 4 and the tip of the crane boom 8. The velocity is measured at a position close to the cargo 3 when looking down at the cargo 3 and vessel floor 4 from the range measurement device 24, thus enabling the control system of the crane (not shown) to actively compensate for relative heave directly below the cargo 3 at any given point of time.

"Heave compensation", "lift off" and "touch down" are three different functions that will typically be available to the crane operator.

"Heave compensation" is the normal operation, where, if the operator is not giving any commands for lowering or raising the cargo, the distance between the cargo 3 and e.g. the ship floor 4 is kept constant despite heave movements on the ship and crane. The cargo will in this mode "follow" the ship floor up and down. This movement is always added to the operators lift commands.

"Lift off" is a function that can be used when the operator wants to automatically let the crane control how the cargo 3 is lifted off e.g. the ship floor 4. The control system will utilize the "heave compensation" mode, but will also predict the next trough of heave, and start to accelerate upwards from the ship floor shortly after the bottom of the heave is passed to obtain a safe lift-off, and continue the upward movement after the heave crest is reached to a ensure a defined distance above the ship floor is reached before the next heave crest is reached.

"Touchdown" is a function that can be used when the operator wants to let the crane automatically control the lowering of the cargo 3 to e.g. a ship floor 4. The operator still has control over the horizontal direction of the cargo (x and y axes), while the control system have full control over the wire rope speed and vertical direction (z axis). The system will predict the next heave crest, and lower the cargo from that time down with a smooth touch down before the heave bottom is reached, and continue the lowering operation to ensure enough slack wire to prohibit the cargo to be lifted off if any of the next heave bottoms are deeper than the one where touchdown was executed.

In an optimal environment setting where no errors exist, it is not necessary to time the lift off or touchdown operations to heave bottom or heave crest respectively. The heave compensation will make these operations risk free in any state of the heave sequences.

One possible embodiment of the present invention may compensate for swing and/or oscillation of the cargo 3 hanging in the wire 9. By feeding the cargo 3 position in real-time to the crane control system (not shown), this information including the length of the wire/rope 9 that is currently used is enough to actively control the crane 5 to compensate for swing/oscillation of the cargo 3 hanging in the wire/rope 9.

A mathematical model describing the kinematics of the crane 5 including wire/rope 9 and cargo/load 3 on wire/rope 9 will be used. Letting the sensor system 1 track the cargo 3 and minimizing the difference between the speed and/or acceleration of the crane boom 8 and the speed and/or acceleration of the cargo 3. Ideally the cargo 3 should have the same acceleration and speed as the tip of the crane boom 8. The control engineering will typically utilize a numerical minimizer, e.g. Levenberg-Marquardt, to minimize the cost function (difference in speed/acceleration of cargo 3 and crane boom tip 8). The input parameters will be wire/rope 9 length, wire rope speed, cargo 3 position relative to the sensor platform 15, all angles of joints of the crane 5 and a mathematical model of the kinematics of the crane 5. The numerical minimizer will be initialized with an initial estimate of the crane control parameters (speed/acceleration/power to all relevant motors/hydraulics) to best match the current state of the cargo 3. Robust estimators and a RANSAC approach will be applied to the initialization procedure.

Another possible embodiment of the present invention is to include a hook arrangement 10 that has remote controlled locking and unlocking capabilities, thus it is possible to increase the level of automation of the crane 5 even further. Instead of an operator actively controlling the crane 5 using its normal controlling devices e.g. sticks, buttons and joysticks, the operator would rely e.g. on one or more touch-screens. One touch-screen may show the view as captured by the camera inside the camera housing 23 located inside the sensor platform 15, pointing downwards, another touch screen or part of the first touch screen may show an area to where the load is to be moved. By touching an object, and/or defining its center, the crane can be controlled to automatically go to the specified position with the optimum speed, and lower the hook arrangement 10 into the correct position. The remote-controlled hook arrangement 10 may then lock on to the cargo 3, and the cargo 3 is ready to be moved. By identifying a target to where the cargo is to be moved by i.e. touching a position on the second screen, the control system can instruct the crane 5 to lift and move the cargo to the desired target area automatically and release the cargo 3 by releasing the remote controlled hook arrangement 10. The distance to the floor of the target position is provided to the control system by the range measurement device 24, hence the control system can define when to slow down/stop the vertical movement of the cargo. The different images on the different screens described above may be displayed on one screen by altering images by a switch or split the screen in multiple parts, each displaying different images. The touch screen functionality may be replaced by other means for navigating and selecting locations on the images, i.e. tracker ball and a pointer icon. Other methods are available for the person skilled in the art of computer graphics.

Semiautomatic performance achieved by letting the crane operator perform some or all parts of the crane control automatic operations described above.

There are multiple options for selecting the target area. Examples include but are not limited to selection based on a predefined "floor plan", or it can be actively selected using the camera of the sensor system 1 or from one or more fixed cameras (not shown) monitoring the target area.

With the aid of the cargo tracker and the ship tracker of the present invention, this can be accomplished by extending the operation of the active swing compensation described above. In addition to compensation of swing, the control engineering logics can apply an optimization problem that minimizes the translation between the cargo/hook and a target position to enable automated movement from a source location and to a target position. Further, the system may automatically load or unload the cargo. It is even possible to define relatively large source- and destination-areas, and let the system scan and detect cargo to be lifted from the source area. The system can also scan and locate available spots locations/areas where there is room to unload the cargo, "spots", in the target area automatically, making the entire load handling automatic, given defined source and target areas.

According to another possible embodiment of the present invention, the invention can be adapted to be used in other application areas such as, but not limited to:
1. Transfer or operations between moving aircrafts in the air
2. Transfer or operations between sea or land and moving aircraft
3. Transfer or operations between moving vehicles on land
4. Transfer or operations between sea or land and moving vehicle on land Some more specific application examples are:
1. Floating wind-mill operations: when e.g. mounting/dismounting blades on a floating windmill, the waves will cause both the floating vessel and the windmill to move. By utilizing the present invention to track e.g. the rotor, a crane or remote controlled arm (or other) will be able to compensate for the movement applied to both the floating vessel and the windmill, making it possible to perform this kind of operation at sea even with large waves.
2. Robotic "follow mode": a vehicle is automatically "hooking onto" another target location 14 and following its movements. Similar to adaptive cruise-control on cars, but by utilizing the present invention not only the speed, but also the direction can be controlled.
3. 3D scanning of moving objects: by utilizing the present invention, it is possible to track the object and make a 3D point cloud of it while it is moving.

A specific embodiment will now be described where the invention is used in a 3D model based tracking of cargo and ship. FIG. 16 describes an overview of the procedure.

The procedure starts with an initialization phase 601. In this phase, as shown in FIG. 17, the operator or the system, locates the current 2D position 701 of the cargo. Feature points are detected 703 and feature point descriptors are computed 704 on a target region of the cargo. The range measurement device is directed toward the target region of the cargo and the distance to the cargo is sampled. The 3D (x,y,z) positions of the feature points can then be determined 705 using the result from the range measurement and the 2D position. Stereo-vision-, SFM- or SLAM-methods may also be used to determine the 3D (x.y.z) positions of the feature points.

The current position of the ship is then located and selected 701 on a screen, or one of several screens as discussed in the above embodiments, by the operator. The ship may also be located by the system by visual recognition. The complete ship does not need to be located, but preferably an as large as possible region of the ship covering at least the position were the cargo should be loaded is located. Feature points are detected 703 and feature point descriptors are computed 704 on the target region of the ship. The range measurement device is directed toward the target region of the ship and the distance to the cargo is sampled. The 3D (x,y,z) positions of the feature points are determined 705 using the result from the range measurement. Stereo-vision-, SFM- or SLAM-methods may also be used to determine the 3D (x.y.z) positions of the feature points. After the initialization phase (601), a number of 3D feature points with descriptors on the cargo and on the ship are known.

Both the cargo and ship are tracked by "tracking-by-detection". The current position of the cargo and ship is computed by matching the feature points detected 803 in the target template with the feature points detected in current frame 801. After the tracking step correspondence between the 3D feature points in the initial frame and 2D feature point in the current frame is established (both for the cargo and ship). The correspondence between the 3D points and 2D points is used to estimate the current pose of the cargo and ship. (The well-known P3P/PnP algorithms are used to estimate the 3D pose.) Optionally the "tracking-by-detection" may also include a target template updating 604. This procedure removes unused or bad feature points and adds new good feature point to the template. The 3D position of the newly added feature point can be computed using the 3D pose estimation 603, 611 (computed using the current template and current frame).

The cargo and the ship are also tracked using a frame-to-frame tracking method 607, 614. In frame-to-frame tracking 607, 614 the initial target template is replaced with the previous frame where the cargo/ship were detected. The frame-to-frame tracking is robust to small inter-frame variations and improve the estimation of the cargo pose. A cargo motion model 605 and ship motion model 613, to be used in Kalman type of filters, are used for further improving the pose estimation. Furthermore, the models can be used for prediction in case of missing observations.

The pose of the cargo and the ship is used to determine a position to where the range measurement device is directed 618. This is done by computing a (2D) vector connecting the center of the cargo and the center of the ship. This is the direction in which the range measurement device will be guided 619 to avoid making measurements directly on the cargo. The step size along this line is determined using the current distance to the cargo.

A ship heave model, to be used in a Kalman type of filters, is used for further improving the estimation of the ship heaves 620. Furthermore, the ship heave model can be used for prediction in case of missing cargo/ship pose estimation or missing observations (laser measurements).

Now, each step in the process where the invention is used in a 3D model based tracking of cargo and ship will be discussed in more detail.

The Feature Pose Initialization (Model based 3D tracking) 601, 609 encompass an input being provided including an image containing the target region (for example the cargo or ship), and the output of this step in the process shall provide 3D feature points (x,y,z) with (2D) descriptors of the feature points. A step by step process for this is shown in FIG. 17, and can be described as follows:

701. Manually/Automatically select the target region to be tracked in the image. The selected region is the target template.

702. Rectification of the target template (such that it is orthogonal against the camera).

703. Detect feature points in the target template.

704. Compute (2D) descriptors for the detected feature points.

705. Direct the range measurement toward the target region and measure the distance (z) to the cargo.

706. Determine the 3D position (x,y,z) of the feature points by concatenating the z distance from the range measurement, assuming that the cargo is a planar object.

As an alternative to 706, SLAM, SFM or stereo vision methods can be used to determine depth/3D positions of the feature points.

The Feature Point Matching (Model based 3D tracking) of ship or cargo 602, 610 encompass an input being provided including feature points and descriptors for the target template or previous frame, and the current frame. The output of this step in the process shall provide matching feature points between the target template and the current frame, and (Optional) updated feature points and descriptors for the target template. A step by step process for this is shown in FIG. 18, and can be described as follows:

801. Detect feature point in the current frame.

802. Compute descriptors for the feature points detected in the current frame.

803. Match the detected feature points with the feature points detected in the target template or previous frame.

The Frame-to-Frame Tracking of ship or cargo 607, 614 encompass an input being provided including the previous frame, the target region in previous frame and the current frame. The output of this step in the process shall provide rotation and translation of the target object between the previous frame and current frame (i.e. the pose change between the frames). A step by step process for this is shown in FIG. 19, and can be described as follows:

901. Extract feature points in the target region in the previous frame

902. Extract descriptors for the detected feature points in the previous frame.

903. Extract feature points in the current frame.

904. Extract descriptors for the detected feature points in the current frame.

905. Match the detected feature points.

906. Estimate the Essential matrix using the matched feature points (given that 8 or more feature points were matched).

907. Extract the rotation R and translation T from the Essential matrix.

As an alternative to step 906 and 907, the following approach may be used:

908 Using the detected feature points, perform a ray-trace in previous frame to obtain the 3D coordinates (x.y.z) of the matched feature points.

909 Using the 3D coordinates (x.y.z) from the ray-trace and the corresponding 2D coordinates from the current frame, estimate an initial pose (rotation R and translation T) using P3P in a RANSAC-scheme

910 Perform a numerical refinement (e.g. Levenberg-Marquardt) of the pose (rotation R and translation T) from the initial pose from P3P/RANSAC.

The Update Target Template 604, 612 encompass an input being provided including the cargo pose, the matched feature points and descriptors and the detected feature points and descriptors. The output of this step in the process shall provide updated feature points and descriptor for the target template. A step by step process for this is shown in FIG. 20, and can be described as follows:

1001. Remove frequently unmatched feature point from the target template.

1002. Remove feature points that are frequently considered to be outliers by the current pose estimator.

1003. Add frequently detected feature point in the target region what is not already part of the target template representation.

The Pose Estimation in 3D 603, 611 encompass an input being provided including matched feature points (i.e. matching between the 3D feature point in the target template and the feature points detected in the current frame), and intrinsic camera parameters (i.e. focal length and camera center). The output of this step in the process shall provide the current 3D position and orientation of the cargo (i.e. a rotation in type of vector map and a translation vector T). A step by step process for this is shown in FIG. 21, and can be described as follows:

1101. Use P3P in a RANSAC scheme to find an initial pose (R',T') that has the most inliers according to a threshold for the re-projection error.

1102. Extract the inliers (2D/3D correspondences) for the initial pose (R',T').

1103. Refine the pose (R',T') by a nonlinear optimization (e.g. Levenberg-Marquardt) that minimize the re-projection error. Only the inliers are used in the minimization and the initial pose (R',T') is set as the starting point.

In the Cargo or Ship Motion Model 605, 613 the cargo or ship motion model component estimate the current position and orientation of the cargo or ship. It is a Kalman type of filter which estimate the position and orientation recursively based on previous observations, current observations and a motion model of the cargo or ship. The cargo or ship motion model can also predict the position of the cargo or ship based on the old observation and the motion model. Examples of motion models are constant velocity and oscillation behavior. The main tasks for the cargo or ship motion model is to give a more accurate estimation of the current position of the cargo or ship and in case of missing observation give a prediction of the current position.

In the Ship Heave Model 620, the ship heave model component estimate the current heave (position)—and heave rate (velocity) of the ship. It is a Kalman type of filter which estimate the heave of the ship recursively based on previous observations, current observations and a heave model (adaptive wave model) of the ship. The heave model can also predict the heave of the ship based on the old observation and the heave model. The main tasks for the ship heave model is to give a more accurate estimation of the heave and heave rate of the ship and in case of missing observations give a prediction of the current heave and heave rate.

In the Laser guidance 618 step, the laser guidance component determine were to direct the range measurement device. A (2D) vector from the center of current position of the cargo to the center of the current position of the ship is computed. A step length along this vector is computed using the current orientation and size of the cargo. The output from the algorithm is a desired 3D point (x, y, z) that the laser beam shall intersect.

In the Laser Control 619 step, the laser control component computes the pan/tilt angles needed in order to intersect a desired 3D point (x, y, z) with the laser beam.

In one or more applications described here within, the distance to the object/surface behind/beneath the tracked object might not be of interest. Instead it might be of higher interest to get and track the 3D position of the tracked object. In this case the focus of io the range measurement device will always be towards the tracked object itself.

It is also possible to track multiple objects in the 2D and or 3D vision methods simultaneously. The depth/distance to each object can then be sampled using the range measurement device, by changing its direction respectively to hit the tracked objects is sequentially.

Using an inclinometer inside the camera housing 23 and the internal camera parameters, it is possible to estimate the position of the boom tip relative to the camera image. The relative position and velocity between the cargo position and the boom tip position can be used to detect and alert swinging cargo, to prevent swinging to occur or dampening swinging by actively controlling the crane control system.

The described embodiments and the details described in each embodiment are not to be used as limitations of the invention, but merely as examples of possible embodiments. Features that are described in the embodiments are not limited to the respective embodiment description, but are to be considered as features that can be used in any of the embodiments or in any other described scenario in this invention description or in the claims or figures.

The invention claimed is:

1. A sensor system comprising:
a sensor platform for describing movement of a surface of a second vehicle relative to a suspended load object, the load object being suspended from a loading device, comprising a crane having a boom with a load line extending downwardly therefrom which the load object is suspended, mounted on a first vehicle and being moved between said first vehicle and said second vehicle, said second vehicle moving independently relative to the first vehicle in both a vertical and a horizontal plane, and
wherein said sensor platform is mounted to the boom with an unobstructed view to the surface of the second vehicle along where the load line extends downwardly from the crane boom, and
wherein said sensor platform comprises an image capturing device for outputting images of the surface of said second vehicle, and a range measurement device, for outputting measurement of a distance in a defined direction between the range measurement device and a selected region of the surface of said second vehicle, and
wherein said sensor platform has an output signal line for transmission of image and range data, and
wherein said sensor system comprises a post processing unit configured for (a) processing of the images being outputted by said image capturing device and range data being outputted by said range measurement device, (b) providing a 3-dimensional description of a selected region of the surface of said second vehicle, the description comprising a position, an orientation, a pose of said second vehicle, and (c) outputting from said post processing unit at least one parameter describing the movement of the surface of said second vehicle relative to said suspended load object.

2. A sensor system as according to claim 1, wherein said range measurement device of said sensor platform provides measurement of a distance in a defined direction between the range measurement device and a selected region of said suspended load object, said post processing unit configured to predict the position of the surface of said second vehicle, and an output from said post processing unit including at least one parameter describing the movement of the surface of said second vehicle relative to said suspended load object.

3. A sensor system according to claim 1, wherein said image capturing device provides images of said suspended load object while said suspended load object is moving relative to said surface of said second vehicle.

4. A sensor system according to claim 3, wherein said sensor system is configured to provide a 3-dimensional description of said selected region of said suspended load object.

5. A sensor system according to claim 3, wherein said provided image is an image of the surface of said second vehicle displayed on a display, said range measurement device measuring the distance between said range measurement device and a selected region selected by identifying said selected region on said display.

6. A sensor system according to claim 5, wherein said display comprises an interactive touch screen configured to enable identification said selected region of said surface of second vehicle or said suspended load object.

7. A sensor system according to claim 1, wherein said loading device is a single crane having a single boom with a single sensor platform mounted to the boom adjacent where the load line extends downwardly from the boom, the single crane adapted to use said output from said post processing unit as input parameters for compensating the position of the load object with movements corresponding to measured or predicted movements of said selected region of the surface of the second vehicle.

8. A sensor system according to claim 3, wherein said sensor platform includes an inclinometer being arranged to estimate a position of the suspension point of said load object being suspended from said loading device mounted on said first vehicle relative to the image capturing device, and use the relative position and velocity between a load position and the suspension point position to detect swinging load.

9. A sensor system according to claim 8 wherein when said load is detected to be swinging, said detection of swinging of said load is used to prevent said swinging, to occur or dampening said swinging by actively controlling a loading operation control system.

10. A sensor system according to claim 1 wherein said sensor platform is mounted to the crane boom where the downwardly extending load line exits from the crane boom, said sensor platform facing downwardly toward the load object suspended from the load line and downwardly toward the surface of said second vehicle.

11. A sensor system according to claim 10 wherein said sensor platform is located at a tip or free end of the boom of the crane.

12. A sensor system according to claim 11 wherein said sensor platform is configured to automatically reorient relative to the tip of the boom to maintain said sensor platform in a downward looking orientation toward the second vehicle during movement of said second vehicle relative to said first vehicle.

13. A sensor system according to claim 1 wherein said image capture device comprises a camera looking downwardly along the load line having a field of view encompassing the load line, the suspended load object and a target area for said load object on said second vehicle.

14. A sensor system according to claim 1 wherein said second vehicle floats on water and which moves vertically and horizontally relative to said boom and said crane mounted on said first vehicle, and said first vehicle is a ship floating on water and which moves vertically and horizontally relative to said second vehicle.

15. A sensor system according to claim 14 where said loading device is a single crane equipped with a single boom to which a single sensor platform is mounted.

16. A method to be used for describing the movement of the surface of a second vehicle relative to a suspended load object comprising:
(a) providing (i) a single loading device that comprises a single crane with a single boom from which a line suspending a load object extends downwardly, the crane carried by a first vehicle and moving the suspended load object toward a load-receiving surface of a second vehicle that is moving independently relative the first vehicle along both a vertical plane and a horizontal plane, (ii) a sensor platform carried by the boom and disposed adjacent where the line extends downwardly from the boom, the sensor platform above the second vehicle and comprising a camera facing downwardly toward the load-receiving surface of the second vehicle for providing image data of the second vehicle and a range measurement device facing downwardly toward the load-receiving surface of the second vehicle for providing range data to the second vehicle, (iii) a post processing unit configured to process the range data outputted by the range measurement device and outputting at least one parameter describing the movement of the surface of the second vehicle relative to the suspended load object;
(b) suspending the load object from the line that extends downwardly from the boom of the crane carried by the first vehicle;
(c) moving the load object suspended by the line extending downwardly from the boom of the crane from the first vehicle toward the second vehicle while the second vehicle is moving relative to the first vehicle in both a vertical plane and a horizontal plane;
(d) obtaining camera image data comprised of camera images captured by the camera of the load-receiving surface of the second vehicle;
(e) obtaining range data comprised of a distance measured by the range measurement device from adjacent where the line suspending the load object extends downwardly from the boom of the crane to a predetermined region of the load-receiving surface of the second vehicle;
(f) outputting the camera image data and the range data to the post-processing unit; and
(g) processing the camera image data and the range data to obtain at least one parameter descriptive of the movement of the surface of the second vehicle relative to the load object suspended from the line.

17. A method as described in claim 16, wherein step (g) of the method further comprises obtaining a 2 or 3 dimensional description of a selected region of the suspended load object and a 2 or 3 dimensional description of a selected region of the surface of the said second vehicle from the camera image data.

18. A method as described in claim 16, wherein the output of the post processing unit is used as input to a controlling unit used to control an active heave compensation of the said suspended load object during the moving operation.

19. A method as described in claim 17, wherein the method further comprises providing an inclinometer configured to enable a position of a suspension point of said load object being suspended from said loading device mounted on said first vehicle relative to the camera to be estimated, and wherein step (g) further comprises (i) estimating the position of the suspension point of said load object being suspended from said loading device mounted on said first vehicle relative to the camera, and (ii) detecting a swinging load using the relative position and velocity between the load object position and the estimated suspension point position.

20. A method as described in claim 19, wherein said first vehicle comprises a ship floating on water and said second vehicle comprises a vehicle floating on water adjacent the ship and which moves independently relative the ship along both a vertical plane and a horizontal plane, and wherein a loading operation control system is controlled using said load swinging detection to prevent load object swinging from occurring or to dampen load object swinging.

* * * * *